(12) United States Patent
Dooley et al.

(10) Patent No.: US 10,372,618 B2
(45) Date of Patent: Aug. 6, 2019

(54) APPARATUS AND METHOD FOR MAINTAINING ADDRESS TRANSLATION DATA WITHIN AN ADDRESS TRANSLATION CACHE

(71) Applicant: ARM LIMITED, Cambridge (GB)

(72) Inventors: Miles Robert Dooley, Austin, TX (US);
Abhishek Raja, Austin, TX (US);
Barry Duane Williamson, Cedar Park, TX (US); Huzefa Moiz Sanjeliwala, Austin, TX (US)

(73) Assignee: ARM Limited, Cambridge (GB)

( * ) Notice: Subject to any disclaimer, the term of this patent is extended or adjusted under 35 U.S.C. 154(b) by 340 days.

(21) Appl. No.: 15/293,467

(22) Filed: Oct. 14, 2016

(65) Prior Publication Data
US 2018/0107604 A1   Apr. 19, 2018

(51) Int. Cl.
*G06F 12/0802* (2016.01)
*G06F 12/1009* (2016.01)
*G06F 12/1027* (2016.01)

(52) U.S. Cl.
CPC ...... *G06F 12/1009* (2013.01); *G06F 12/0802* (2013.01); *G06F 12/1027* (2013.01);
(Continued)

(58) Field of Classification Search
CPC ........... G06F 2212/651; G06F 2212/60; G06F 12/0802; G06F 12/1009; G06F 12/1027; G06F 2212/681; G06F 2212/682
See application file for complete search history.

(56) References Cited

U.S. PATENT DOCUMENTS 5,226,133 A * 7/1993 Taylor ................. G06F 12/1054
711/207
2006/0206686 A1  9/2006 Banerjee
(Continued)

OTHER PUBLICATIONS

U.S. Appl. No. 15/294,031, filed Oct. 14, 2016; Williamson et al.
(Continued)

*Primary Examiner* — Larry T Mackall
(74) *Attorney, Agent, or Firm* — Nixon & Vanderhye P.C.

(57) ABSTRACT

An apparatus and method are provided for maintaining address translation data within an address translation cache. The address translation cache has a plurality of entries, where each entry is used to store address translation data used when converting a virtual address into a corresponding physical address of a memory system. Control circuitry is used to perform an allocation process to determine the address translation data to be stored in each entry. The address translation cache is used to store address translation data of a plurality of different types representing address translation data specified at respective different levels of address translation within a multiple-level page table walk. The plurality of different types comprises a final level type of address translation data that identifies a full translation from the virtual address to the physical address, and at least one intermediate level type of address translation data that identifies a partial translation of the virtual address. The control circuitry is arranged, when performing the allocation process, to apply an allocation policy that permits each of the entries to be used for any of the different types of address translation data, and to store type identification data in association with each entry to enable the type of the address translation data stored therein to be determined. Such an approach enables very efficient usage of the address translation cache resources, for example by allowing the proportion of the entries used for full address translation data and (Continued)

ENTRIES IN UNIFIED ADDRESS TRANSLATION CACHE

| 205 | 210 | 215 | 220 | 222 | 225 |
|---|---|---|---|---|---|
| VIRTUAL ADDRESS BITS [47:12] | PHYSICAL ADDRESS BITS [47:12] | PAGE SIZE | ATTRIBUTE BITS | V | ENTRY TYPE |
| | | | | | |

200 ↙
30 ↙ the proportion of the entries used for partial address translation data to be dynamically adapted to changing workload conditions.

14 Claims, 19 Drawing Sheets

(52) U.S. Cl.
CPC .... *G06F 2212/60* (2013.01); *G06F 2212/651* (2013.01); *G06F 2212/681* (2013.01); *G06F 2212/682* (2013.01)

(56) References Cited

U.S. PATENT DOCUMENTS

| | | | |
|---|---|---|---|
| 2009/0292899 A1* | 11/2009 | Mansell | G06F 12/1009 711/207 |
| 2013/0238874 A1 | 9/2013 | Avudaiyappan | |
| 2014/0136773 A1 | 5/2014 | Michalak | |
| 2014/0201494 A1* | 7/2014 | Venkumahanti | G06F 12/1027 711/207 |
| 2015/0095610 A1 | 4/2015 | Ben-Meir | |
| 2016/0231933 A1 | 8/2016 | Loh | |

OTHER PUBLICATIONS

Office Action dated Nov. 28, 2017 in co-pending U.S. Appl. No. 15/294,031, 6 pages.
Barr et al., "Translation Caching: Skip, Don't Walk (the Page Table)", *ISCA '10*, Jun. 19-23, 2010, 12 pages.
Jaleel et al., "High Performance Cache Replacement Using Re-Reference Interval Prediction (RRIP)" ISCA'10, Jun. 19-23, 2010, 12 pages.

\* cited by examiner

| VIRTUAL ADDRESS BITS [47:12] | PHYSICAL ADDRESS BITS [47:12] | PAGE SIZE | ATTRIBUTE BITS | V | ENTRY TYPE |
|---|---|---|---|---|---|
| 205 | 210 | 215 | 220 | 222 | 225 |

ENTRIES IN UNIFIED ADDRESS TRANSLATION CACHE

FIG. 4

FOR UNIFIED ADDRESS TRANSLATION CACHE WITH 512 SETS:

| PAGE SIZE | INDEX BITS | COMPARE BITS | ENTRY TYPE |
|---|---|---|---|
| 4 KB | [20:12] | [47:21] | FULL |
| 2 MB | [29:21] | [47:30] | PARTIAL (S1 L2) |
| 1 GB | [38:30] | [47:39] | PARTIAL (S1 L1) |

SIZE ALLOCATION VECTOR(S)

1-BIT PER SIZE SET BY ALLOCATION CIRCUITRY
WHEN ADDRESS TRANSLATION DATA FOR A PAGE OF
THAT SIZE IS STORED IN THE UNIFIED
ADDRESS TRANSLATION CACHE (CAN HAVE SEPARATE VECTORS FOR
FULL AND PARTIAL ADDRESS TRANSLATIONS)

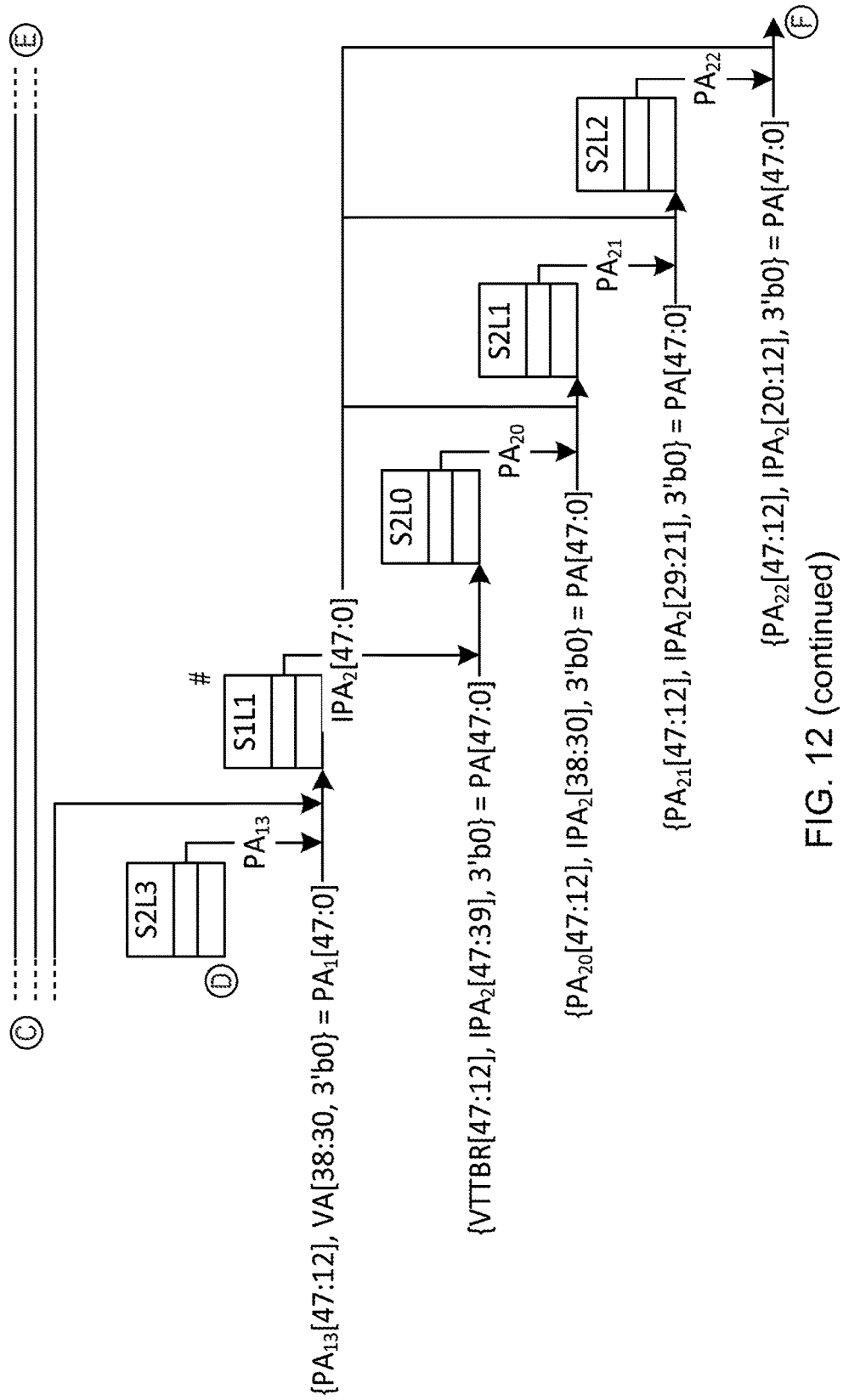

APPARATUS AND METHOD FOR MAINTAINING ADDRESS TRANSLATION DATA WITHIN AN ADDRESS TRANSLATION CACHE

BACKGROUND

The present technique relates to an apparatus and method for maintaining address translation data within an address translation cache.

It is known to provide data processing systems which incorporate one or more distinct types of address translation cache. For example an address translation cache such as a translation lookaside buffer (TLB) may be used to store address translation data that identifies a full translation from a virtual address to a physical address. However, as another example of address translation cache, a walk cache may be provided that stores address translation data that identifies a partial translation of a virtual address, which can be useful in improving performance by reducing the number of slow page table walks required. Such a walk cache is typically provided as a separate structure to a TLB. Alternatively, a single physical storage structure such as random access memory (RAM) may be used to support the provision of both a walk cache and a TLB, but with a hard partitioning of the resources between those resources used for the TLB and those resources used for the walk cache.

Such address translation caches consume significant circuit resources, and accordingly it is desirable that efficient use be made of the capacity of the resources used for address translation caching.

SUMMARY

At least some embodiments of the present disclosure provide an apparatus comprising: an address translation cache having a plurality of entries, each entry to store address translation data used when converting a virtual address into a corresponding physical address of a memory system; control circuitry to perform an allocation process to determine the address translation data to be stored in each entry; the address translation cache arranged to store address translation data of a plurality of different types representing address translation data specified at respective different levels of address translation within a multiple-level page table walk, said plurality of different types comprises a final level type of address translation data that identifies a full translation from the virtual address to the physical address, and at least one intermediate level type of address translation data that identifies a partial translation of the virtual address; and the control circuitry arranged, when performing the allocation process, to apply an allocation policy that permits each of the entries to be used for any of said plurality of different types of address translation data, and to store type identification data in association with each entry to enable the type of the address translation data stored therein to be determined.

At least some embodiments of the present disclosure provide a method of maintaining address translation data within an address translation cache having a plurality of entries, each entry to store address translation data used when converting a virtual address into a corresponding physical address of a memory system, the method comprising: performing an allocation process to determine the address translation data to be stored in each entry; storing within the address translation cache address translation data of a plurality of different types representing address translation data specified at respective different levels of address translation within a multiple-level page table walk, said plurality of different types comprises a final level type of address translation data that identifies a full translation from the virtual address to the physical address, and at least one intermediate level type of address translation data that identifies a partial translation of the virtual address; and when performing the allocation process, applying an allocation policy that permits each of the entries to be used for any of said plurality of different types of address translation data, and storing type identification data in association with each entry to enable the type of the address translation data stored therein to be determined.

At least some embodiments of the present disclosure provide an apparatus comprising: an address translation cache means for having a plurality of entries, each entry for storing address translation data used when converting a virtual address into a corresponding physical address of a memory system; control means for performing an allocation process to determine the address translation data to be stored in each entry; the address translation cache means for storing address translation data of a plurality of different types representing address translation data specified at respective different levels of address translation within a multiple-level page table walk, said plurality of different types comprises a final level type of address translation data that identifies a full translation from the virtual address to the physical address, and at least one intermediate level type of address translation data that identifies a partial translation of the virtual address; and the control means for applying, when performing the allocation process, an allocation policy that permits each of the entries to be used for any of said plurality of different types of address translation data, and for storing type identification data in association with each entry to enable the type of the address translation data stored therein to be determined.

BRIEF DESCRIPTION OF THE DRAWINGS

The present technique will be described further, by way of example only, with reference to embodiments thereof as illustrated in the accompanying drawings, in which:

FIG. 4 is a diagram schematically illustrating fields provided within each entry of the address translation cache in accordance with one embodiment;

DESCRIPTION OF EMBODIMENTS

Figure 1:
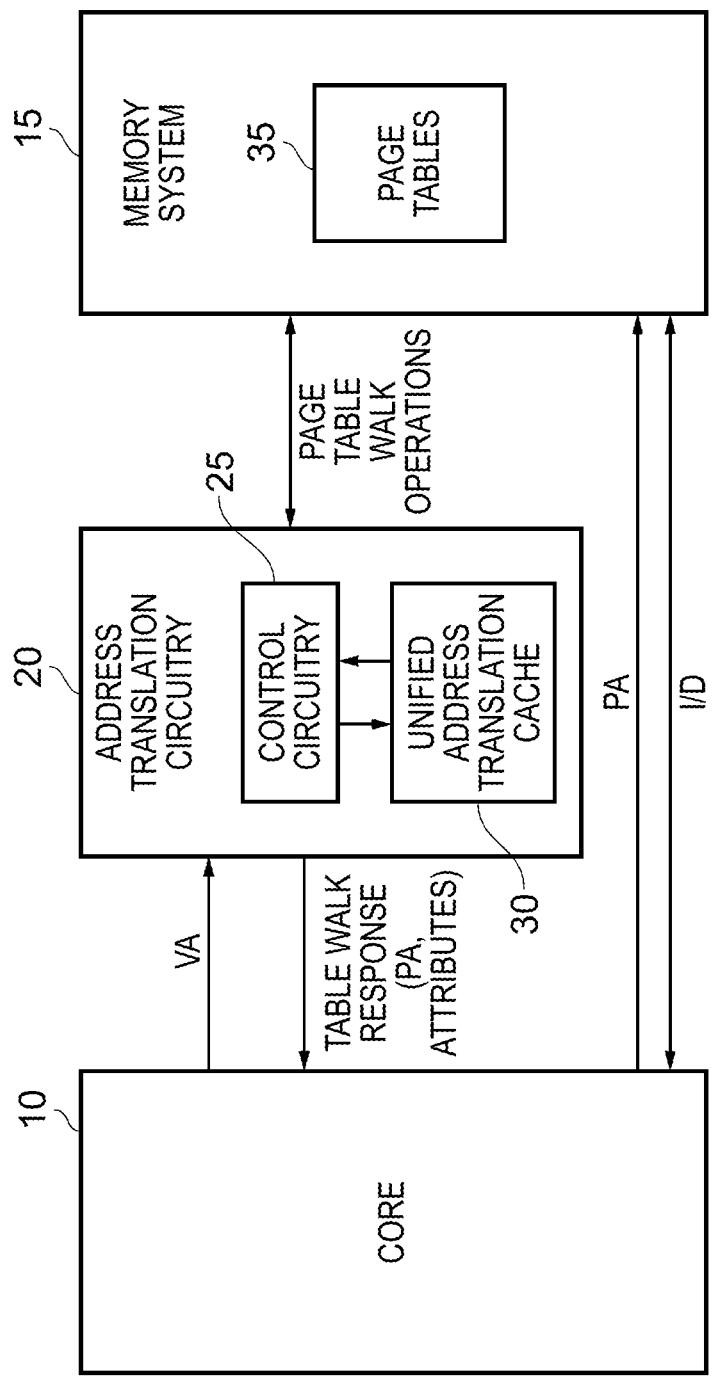
FIG. 1 illustrates a data processing system incorporating an address translation cache in accordance with one embodiment.

Before discussing the embodiments with reference to the accompanying figures, the following description of embodiments is provided.

In one embodiment, an apparatus is provided that has an address translation cache having a plurality of entries, where each entry is used to store address translation data used when converting a virtual address into a corresponding physical address of a memory system. Control circuitry is used to perform an allocation process to determine the address translation data to be stored in each entry.

The address translation cache is used to store address translation data of a plurality of different types representing address translation data specified at respective different levels of address translation within a multiple-level page table walk. A multiple-level page table walk typically involves using different portions of a specified virtual address to walk through a series of page tables, with each page table providing a descriptor, until a final level descriptor is identified, at which point it can be determined how to convert the virtual address into a corresponding physical address. The different types of address translation data stored in the address translation cache comprise both a final level type of address translation data that identifies a full translation from the virtual address to the physical address, and at least one intermediate level type of address translation data that identifies a partial translation of the virtual address. Hence, in accordance with the present technique, both address translation data identifying a full translation and address translation data identifying a partial translation are allowed to co-exist within the same address translation cache.

The control circuitry is then arranged, when performing the allocation process, to apply an allocation policy that permits each of the entries to be used for any of the different types of address translation data, and to store type identification data in association with each entry to enable the type of the address translation data stored therein to be determined.

The inventors of the present technique realised that existing solutions that provide a walk cache for storing partial address translation data and a TLB for storing full address translation data can result in inefficient utilisation of the available storage resources in certain situations. In contrast, the technique used in the embodiment described above provides a unified address translation cache that enables any entry to be used for any type of address translation data. The control circuitry applies an allocation process in order to determine, for each entry, the type of address translation data to be stored in that entry at any point in time. Hence, any individual entry may be used some of the time to store address translation data identifying a full translation from a virtual address to a physical address, and at other points in time may be used to store address translation data that identifies a partial translation of a virtual address. Thus an entry can be selected for allocation independently of the type of the address translation data that is to be allocated in to it.

By providing such flexibility as to how the individual entries of the address translation cache are used, this enables the use of the unified address translation cache storage to be dynamically adapted to changing workload conditions.

Purely by way of example, a workload with a very large memory footprint consisting of many pages may achieve a low hit rate in respect of full address translation data, i.e. the type of address translation data typically stored in the TLB. Under such conditions, the TLB storage which is dedicated to storing that type of address translation data is not providing much benefit. Instead, only the storage that provides the partial address translation data (typically the earlier-mentioned walk cache in existing techniques) will be achieving high hit rates. However, it is possible that the size of the walk cache is insufficient to store all of the partial address translation data that would be useful. In contrast, when using the unified address translation cache of the described embodiments, under such circumstances the proportion of the entries used to store partial address translation data will dynamically be increased relative to the proportion of the entries used to store full address translation data, hence adapting to the workload conditions. This enables a much more efficient usage to be made of the available resources for storing address translation data.

The type identification data stored in association with each entry to enable the type of the address translation data stored therein to be determined can take a variety of forms. In one embodiment, it may be sufficient for the type identification data to comprise a page size identifier indicating a page size of a page within the memory system that is associated with the address translation data. In particular, in some embodiments it may be that different page sizes are used for the different levels of address translation, and hence the page size information itself is sufficient to distinguish between the various types of address translation data (and thus for example whether a particular entry stores address translation data identifying a full translation or address translation data identifying a partial translation).

However, if necessary, the type identification data may further comprise additional identification data to distinguish between different types of address translation data that are associated with the same page size.

The address translation cache can take a variety of forms. In one embodiment the address translation cache may be a fully associative cache, and the control circuitry is permitted, when performing the allocation process for current address translation data, to select any of the entries as an entry into which to store the current address translation data. Hence, in such an embodiment, for any supplied virtual address, matching address translation data may exist within any of the entries of the address translation cache.

In an alternative embodiment, the address translation cache may be a set associative cache, and the allocation policy permits each entry in each set to be used for any of said plurality of different types of address translation data. The control circuitry is then arranged, when performing the allocation process for current address translation data, to select a subset of bits of virtual address data specified by the current address translation data in dependence on a page size of a page within the memory system that is associated with the address translation data, and to use said subset of bits as an index to identify a set within the set associative cache. The control circuitry then stores the current address translation data in one of the entries of the identified set. Hence, whilst in the set associative cache example it is still the case that any entry can be used for any type of address translation data, when a particular virtual address is considered, there will only be a subset of the entries that could potentially store matching address translation data. When allocating address translation data into such a cache, the page size associated with that address translation data is used to determine the bits of the virtual address data that are used to index into the set associative cache structure, and hence to determine the set in which the address translation data is stored. Once that set has been identified, any of the entries within that set can be used to store the address translation data. Hence, at any point in time, an individual set within the set associative cache may have some entries that store full address translation data and some entries that store partial address translation data.

In one embodiment, each entry in the address translation cache has virtual address data associated therewith, and the control circuitry is responsive to a received virtual address, to perform a lookup process to determine with reference to the virtual address data of at least a subset of the entries whether a hit condition is detected. For a fully associative structure, it may be necessary to check all of the entries of the address translation cache in order to determine whether a hit condition is detected. For a set associative cache structure, it will be necessary to only perform a lookup in one or more sets of the cache. In one embodiment, during the lookup process performed in association with a set associative cache, a number of possible page sizes will be considered, each page size identifying different virtual address portions, and hence potentially identifying different sets. As a result, it may be necessary to access more than one set when performing the lookup process in respect of the set associative address translation cache structure.

It is possible during the lookup process that more than one hit condition may be detected. This is due to the fact that multiple different types of address translation data may be stored within the same address translation cache, and hence a hit condition could potentially be detected for each of those address translation types. In one embodiment, the control circuitry is arranged, in the presence of the hit condition being detected for multiple entries, to select one of the multiple entries whose address translation data represents a most complete address translation for the received virtual address. Hence, if a hit condition is detected for an entry that stores full address translation data, then that entry will be selected, as it represents the most complete address translation for the received virtual address.

In one embodiment, in response to selecting an entry for which the hit condition has been detected, the control circuitry is further arranged, when the address translation data stored in that selected entry is of said at least one intermediate level type of address translation data, to perform a remaining part of the multiple-level page table walk required, starting with the address translation data stored in the selected entry. Hence, when there is no hit condition detected for an entry storing full address translation data, then if there is a hit condition for an entry storing partial address translation data, that entry will be selected, as this will enable at least part of the page table walk process to be avoided, hence improving performance. It is possible that multiple hit conditions could occur in respect of partial address translation data, related to different levels in the multiple-level page table walk process. In that event, then in one embodiment the entry that stores the most complete address translation data is used, so as to minimise the remaining part of the page table walk process that is required.

The lookup process could be managed in a variety of ways. In one embodiment where the address translation cache is a fully associative cache, then for each entry, the control circuitry is arranged to identify a page size of a page within the memory system that is associated with the address translation data stored in that entry, and to determine from said size a subset of the received virtual address bits to be compared with corresponding bits of the virtual address data. The control circuitry is then arranged to detect the hit condition in dependence on whether said subset of the received virtual address bits match the corresponding bits of the virtual address data.

In one embodiment, the multiple-level page table walk process involves, at each level, a single stage. However, in an alternative embodiment multiple stages may be involved at each level. For example, a first stage of translation may correspond to address translation managed by a guest operating system, whilst a second stage of translation may correspond to address translation managed by a hypervisor. In embodiments where multiple stages of address translation are supported, the unified address translation cache can be arranged to store address translation data associated with each of those multiple stages. In one such embodiment, the type identification data stored in each entry identifies which stage the address translation data is associated with, and the control circuitry is arranged to prevent detection of the hit condition for an entry when the received virtual address relates to a different stage to the stage indicated by the type identification data of that entry.

In one embodiment where the address translation cache is a set associative cache, the control circuitry is arranged to implement the lookup process by performing a sequence of lookup operations, each lookup operation having an associated type, the associated type comprising at least an associated page size. For each lookup operation, the control circuitry is arranged to select a first subset of the received virtual address bits in dependence on the associated page size, and to use said first subset of the received virtual address bits as an index to identify a set within the set associative cache. The control circuitry is further arranged to identify in dependence on the associated page size a second subset of the received virtual address bits to be compared with corresponding bits of the virtual address data, and the control circuitry is arranged to detect the hit condition during performance of the lookup operation when said second subset of the received virtual address bits match the corresponding bits of the virtual address data within an entry of the identified set and the type identification data for that entry matches the associated type for the lookup operation.

In one embodiment, this process can be repeated iteratively using different associated types for each lookup operation. In one particular embodiment, the sequence of lookup operations are ordered such that one or more lookup operations for said final level type of address translation data are first performed, and then in the absence of the hit condition being detected one or more lookup operations are performed for said at least one intermediate level type of address translation data. Hence, in such an embodiment a check can first be performed to see if there is a hit with respect to a final level type of address translation data, since in the presence of such a hit no further lookup is required. However, in the absence of a final level type of address translation data hit being detected, then one or more additional lookup operations can be performed for one or more intermediate level types of address translation data.

In order to seek to improve the efficiency of the lookup operations performed, in one embodiment the control circuitry may be arranged to maintain a record of page sizes of address translation data allocated into entries of the address translation cache. The control circuitry is then arranged to reference that record when determining the sequence of lookup operations to be performed. For example, if the record indicates that no entries have been allocated for a particular page size, there is no need to perform a lookup operation for that page size, and hence efficiency can be improved by maintaining such a record. In one embodiment, the record may identify page sizes of address translation data for each of the different types of address translation data. Hence, purely by way of example, whilst the record may indicate that at least one entry has been allocated for full address translation data relating to a particular page size, it may also indicate that no entry has been made for partial address translation data for that page size. It can be useful to provide the information at that granularity, so as to further improve the efficiency of the lookup operations performed by the control circuitry.

Indeed, in embodiments where at each level of the page table walk, multiple stages of address translation are used, such a record can also keep information about the page sizes of address translation data allocated into entries of the address translation cache for each stage. Typically when a lookup operation is performed, it is known which stage the lookup operation relates to, and accordingly by maintaining such data separately for each of the multiple stages, this can further improve the efficiency of the lookup operation.

Particular embodiments will now be described with reference to the Figures.

FIG. 1 schematically illustrates a data processing system including a processor core 10 for executing program instructions and for performing data accesses (both instruction fetches and accesses to data to be manipulated) using virtual addresses VA. These virtual addresses are subject to address translation to physical addresses PA by address translation circuitry 20. The physical addresses are used to control access to instructions and data in a memory system 15. The memory system 15 may comprise a memory hierarchy, such as multiple levels of cache memory and a main memory or other non-volatile storage.

As shown in FIG. 1, the address translation circuitry 20 includes a unified address translation cache 30, which in one example may avoid the need to separately provide a translation lookaside buffer (TLB) to store full address translation data, and a walk cache to store partial address translation data. The address translation cache 30 has a plurality of entries, where each entry stores address translation data used when converting a virtual address into a corresponding physical address of a memory system. The address translation data is determined by performing page table walk operations in respect of page tables 35 stored within the memory system 15. As will be discussed later with reference to FIG. 3, a multi-level page table walk process may be used in order to obtain with reference to a final level descriptor full address translation data enabling a virtual address to be converted into a physical address, and that full address translation data may be stored within the address translation cache 30. However, partial address translation data will also be obtained during the earlier, intermediate, levels of the page table walk process, with reference to intermediate level descriptors, and such partial address translation data can also be stored within the address translation cache 30. As will be discussed in more detail later, an allocation policy used for the address translation cache enables any type of address translation data (whether full or partial) to be stored in any entry of the address translation cache.

As shown schematically in FIG. 1, when the core 10 issues a virtual address to the address translation circuitry 20, the control circuitry can perform a lookup operation within the address translation cache 30 to determine whether a hit is detected within one of the entries of the address translation cache. If the address translation cache is arranged in a fully associative manner, all of the entries may be considered during the lookup operation. However, if the address translation cache has a set associative structure, then certain bits of the virtual address will be used as an index into the address translation cache in order to identify a set, and the entries within that set will be reviewed in order to determine whether a hit is detected. As will be discussed in more detail later, multiple different sets may be identified to take account of different assumptions as to page size associated with the address translation data, and each set can be checked for a hit. If a hit is detected, then a table walk response can be returned directly to the processor core 10 if the address translation data is full address translation data, this including physical address bits and associated attributes stored within the hit entry within the address translation cache. Based on this information, the core can then generate a physical address to then output to the memory system 15 in order to access a required instruction or data to be manipulated.

If the hit relates to partial address translation data then this can be used to reduce the number of page table walks required to be performed with respect to the page tables 35 in memory 15 in order to enable the full address translation data to be determined, with the table walk response being generated once that remaining portion of the page table walk process has been completed. If a hit is not detected within the address translation cache, the address translation circuitry 20 will initiate the page table walk process in order to access the relevant page tables 35 within the memory system in order to walk through a sequence of descriptors until a final level descriptor is obtained, at which point full address translation data can be determined and an appropriate table walk response can then be returned to the core. During this process, one or more entries within the address translation cache 30 can be allocated to store address translation data derived from the accessed descriptors. This is likely to enable a subsequently issued virtual address to result in a hit within the address translation cache, thereby reducing access times.

Figure 2:
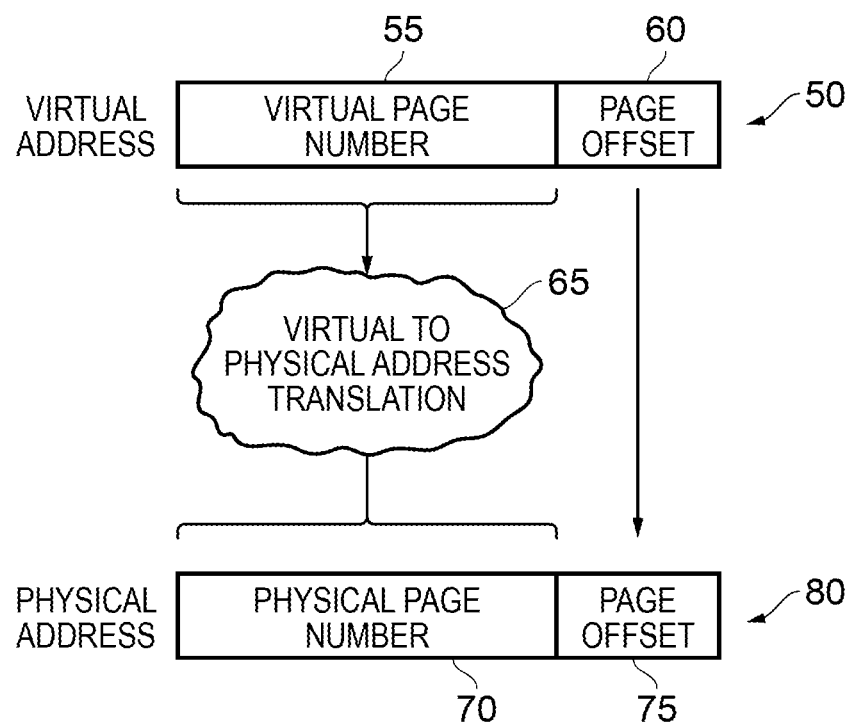
FIG. 2 is a diagram schematically illustrating a virtual to physical address translation process.

FIG. 2 is a diagram schematically illustrating the address translation process. A virtual address 50 can be considered to comprise a number of bits 55 identifying a virtual page number, and some other bits 60 identifying a page offset. The number of bits forming the virtual page number and the number of bits forming the page offset will depend on the page size. The address translation operation performed by the address translation circuitry 20 is illustrated schematically by the element 65 shown in FIG. 2, and serves to obtain address translation information sufficient to enable the virtual page number bits to be translated into equivalent bits 70 of a physical address 80 identifying a physical page number. The page offset bits are not altered, and accordingly the page offset bits 75 are directly determined from the page offset bits 60 in the virtual address.

Figure 3:
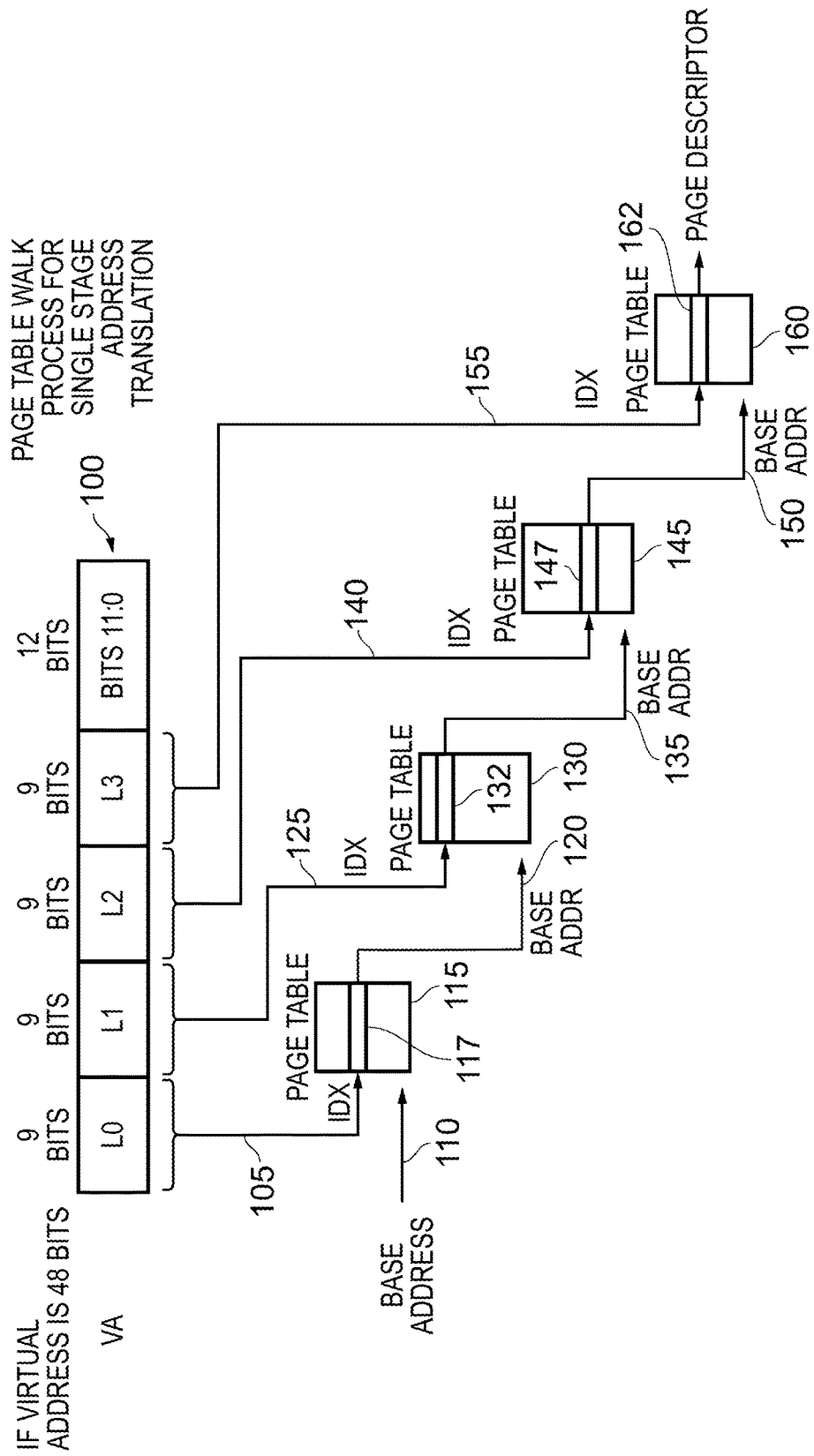
FIG. 3 schematically illustrates a multi-level page table walk which includes a single stage address translation process.

FIG. 3 is a diagram schematically illustrating the page table walk operation assuming there is a single stage address translation mechanism being used. In this example, it is assumed that the virtual address is 48 bits, and hence the virtual address 100 has a series of 9 bit portions associated with different levels of the page table walk process, with the 12 least significant bits then not being used in the page table walk process.

At the start of the page table walk process, a base register is accessed to identify a base address 110 that is used to identify a base address of the page table 115. The 9 bits 105 associated with level zero of the page table walk process are used to identify an index into that page table 115, and hence identifies an intermediate level descriptor 117. This intermediate level descriptor 117 provides a base address 120 that is used to identify a further page table 130, with the level one virtual address bits 125 being used to identify an index into that table. This identifies the intermediate level descriptor 132 that provides a further base address 135 to identify the page table 145. The level 2 virtual address bits 140 are then used to provide an index into that table 145 in order to identify the intermediate level descriptor 147, which then provides the base address 150 that identifies a final page table 160. The level 3 virtual address bits 155 then provide an index into that table 160, identifying a final level descriptor 162 also referred to as a page descriptor. With the information provided by the page descriptor, it is then possible to generate full address translation data for storing in one of the entries of the address translation cache 30, enabling the virtual page number 55 to be converted into a physical page number 70 and hence allowing the required page in memory to be identified. This then enables the particular item of data (or instruction) corresponding to the virtual address to then be accessed by the core 10 issuing the required physical address to the memory system 15.

As mentioned earlier, the address translation cache can also be used to store partial address translation data obtained as a result of accessing intermediate level descriptors, so as to shorten the amount of time required to perform the page table walk process. For example, if partial address translation data associated with the level 2 page table walk is stored in an entry, and a hit is detected for that entry based on a received virtual address, it may then be necessary only to perform the level 3 page table walk process in order to be able to determine the full address translation data for that virtual address.

It should be noted that in some embodiments final level descriptors can be specified at an earlier level in the page table walk process. For example, the descriptor 147 can have a block field which, when set, indicates that that descriptor is a block descriptor, which is a type of final level descriptor, rather than being an intermediate level descriptor. Hence, the information within the descriptor 147 can be used to produce the full address translation data.

FIG. 4 is a diagram schematically illustrating the fields that may be provided within each entry of the unified translation cache 30 in accordance with one embodiment. As shown, an entry 200 may include a virtual address portion 205 containing a certain number of the virtual address bits. The number of bits stored in this field will be dependent on embodiment, but assuming the earlier example of FIG. 3 where the most significant 36 bits of a 48-bit virtual address are used during the multi-level page table walk process, bits 47 to 12 may be stored within the virtual address field 205. A corresponding physical address field 210 is used to store corresponding physical address bits. When the entry is storing full address translation data, these physical address bits will represent the corresponding physical page number used when translating the virtual address to a physical address. However, when the entry stores partial address translation data, these physical address bits will be used to identify a partial translation, for example identifying a base address of the next page table within the page table walk process.

In one embodiment, a page size field 215 is provided to indicate a page size of a page within the memory system that is associated with the address translation data stored in that entry. The field 220 is used to store other attribute data associated with the address translation data. These attributes can take a variety of forms, and may for example include access permissions, and memory type information, such as whether the associated page relates to a writeback region of memory, a non-cacheable region, etc. A further field 222 is used to store a valid bit to identify if the entry stores valid information.

In some embodiments, the page size information itself may be sufficient to identify whether the entry provides full address translation data, or provides partial address translation data associated with a particular intermediate level of address translation. For example, the page sizes associated with full address translations may be at a finer granularity (i.e. may be smaller sized pages) than the pages associated with partial address translations. However, in some embodiments there may be some overlap between page sizes associated with full address translation data and page sizes associated with partial address translation data, and hence in one embodiment an entry type field 225 is provided to use in combination with the page size information in the field 215 to determine the type of address translation data stored in the corresponding entry. In another embodiment, the page size information could be encoded as part of the "type" information, such that the page size field 215 and type field 225 are logically combined into a single field that conveys both type and size, thereby potentially reducing the amount of storage required for the combination of the type and size fields.

Figure 12:
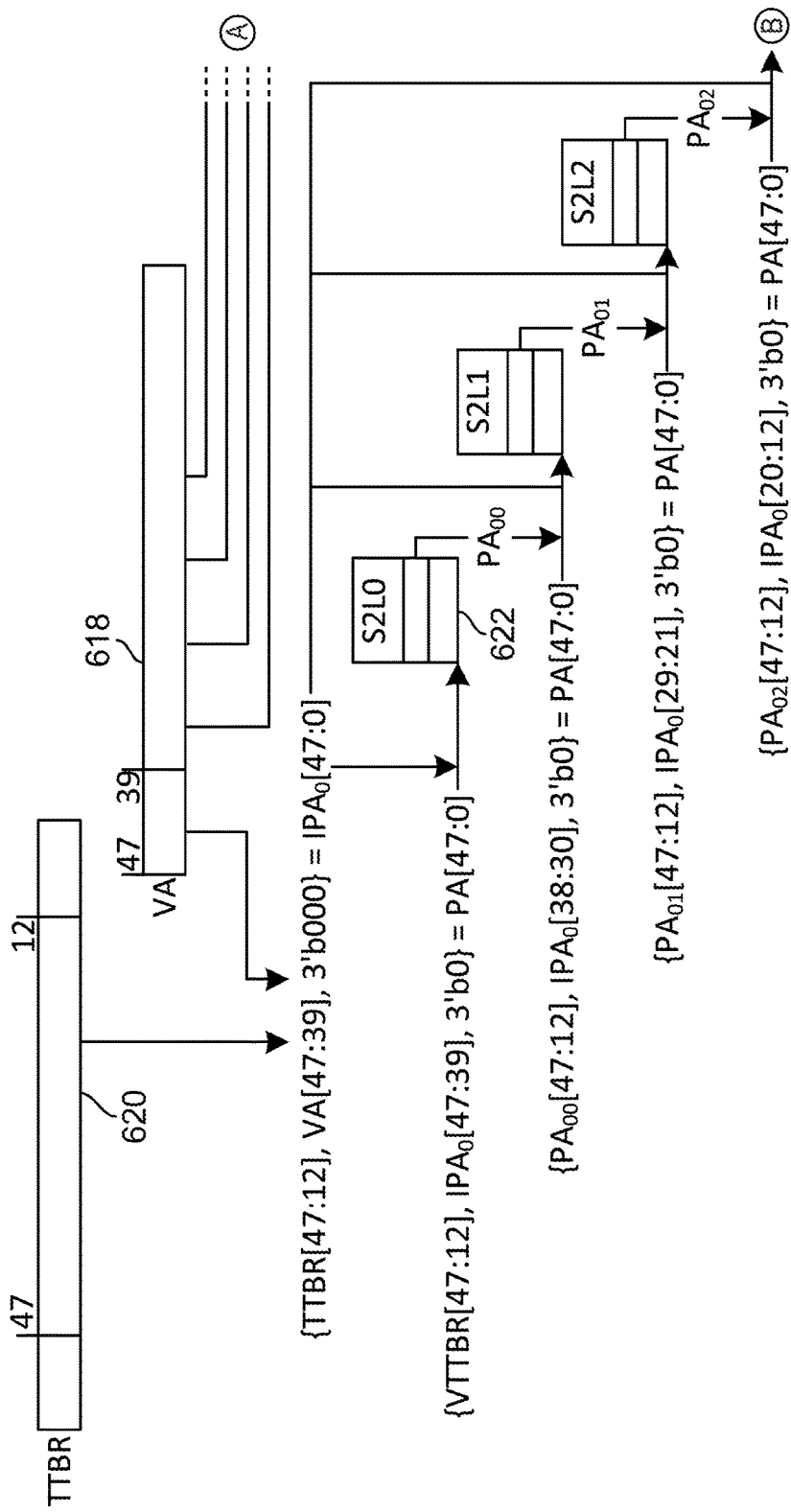
FIG. 12 schematically illustrates a multiple-level page table walk which includes both a first stage of translation corresponding to address translation managed by a guest operating system and a second stage of translation corresponding to address translation managed by a hypervisor.
Figure 12:
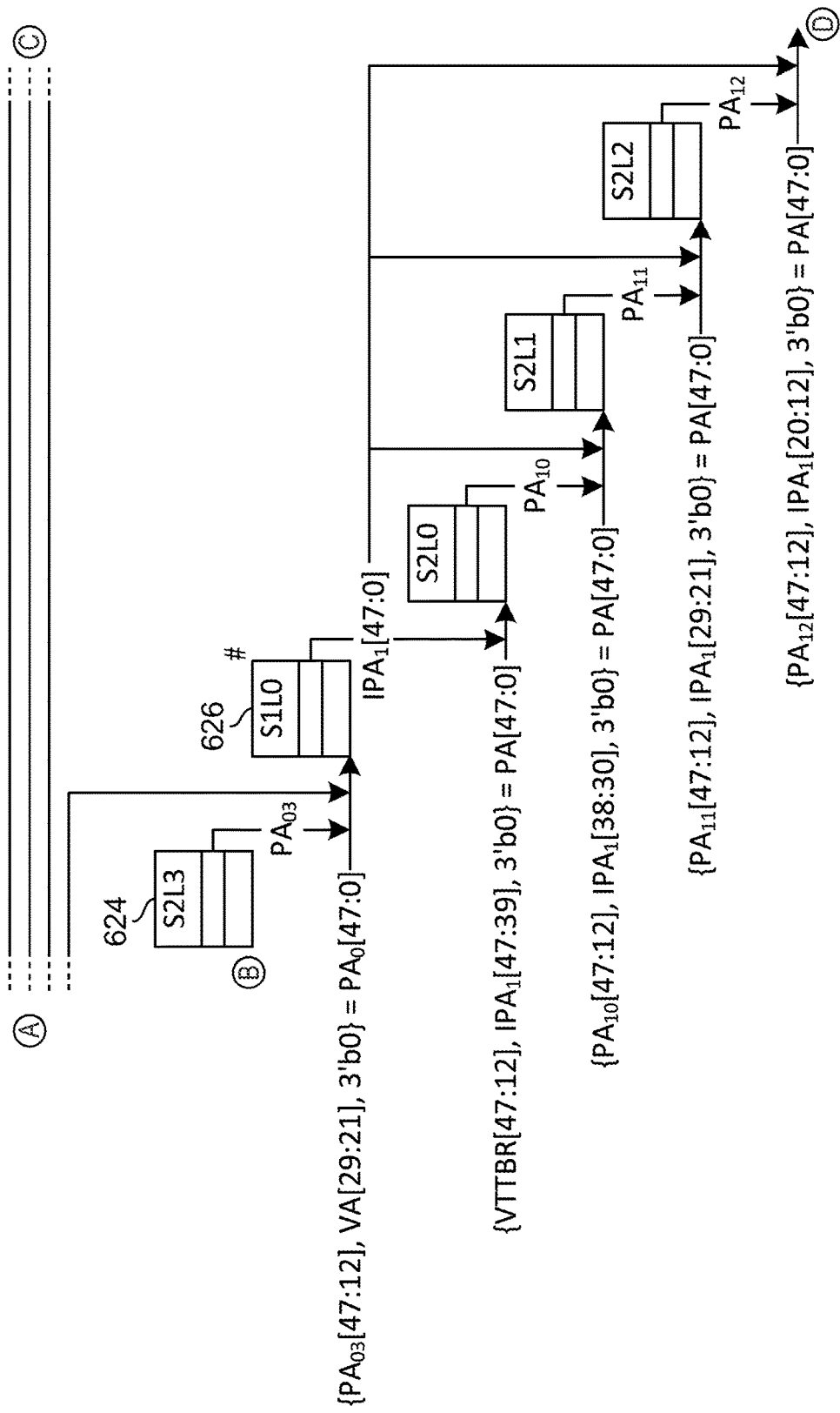
Figure 12:
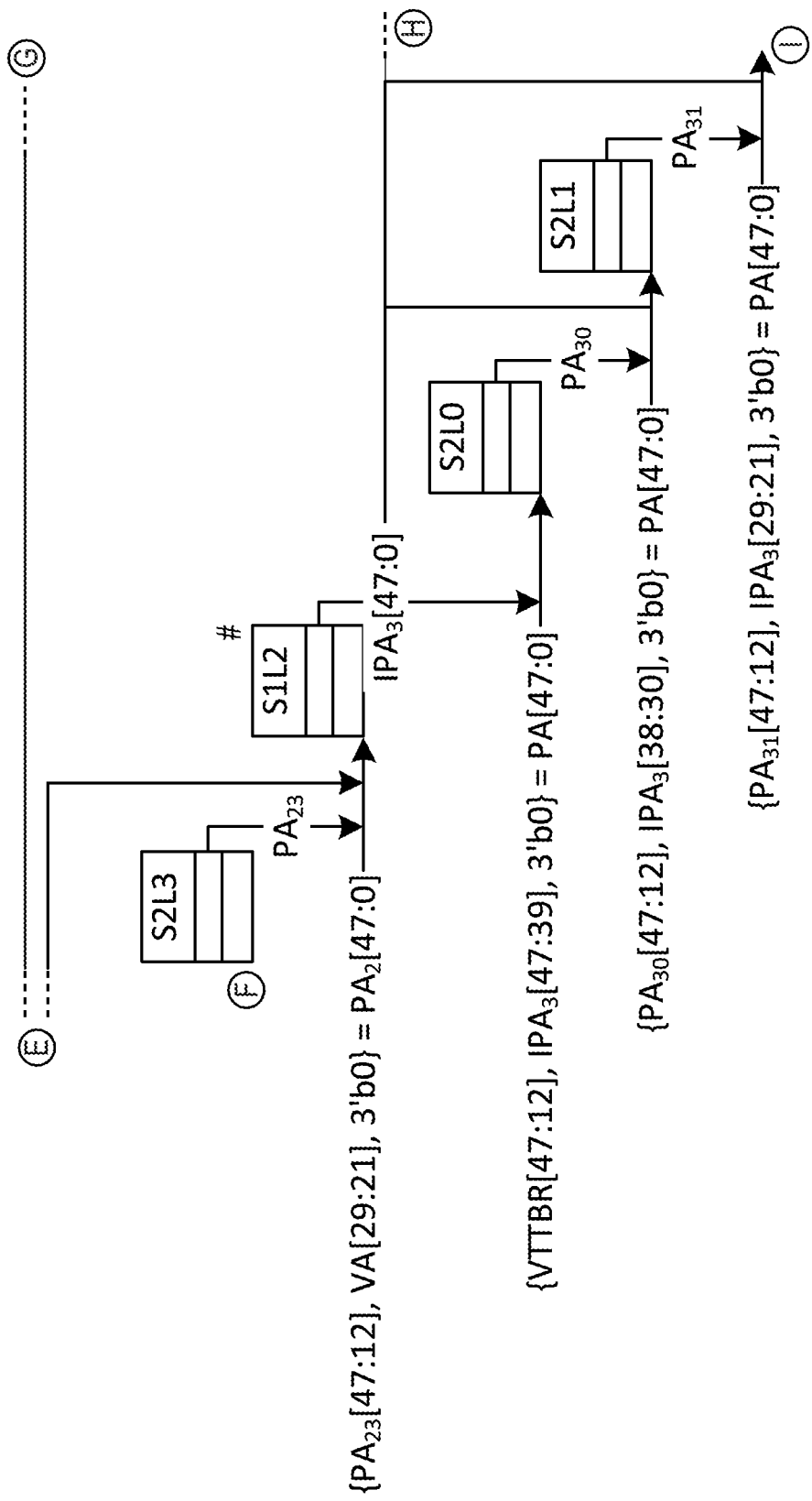
Figure 12:
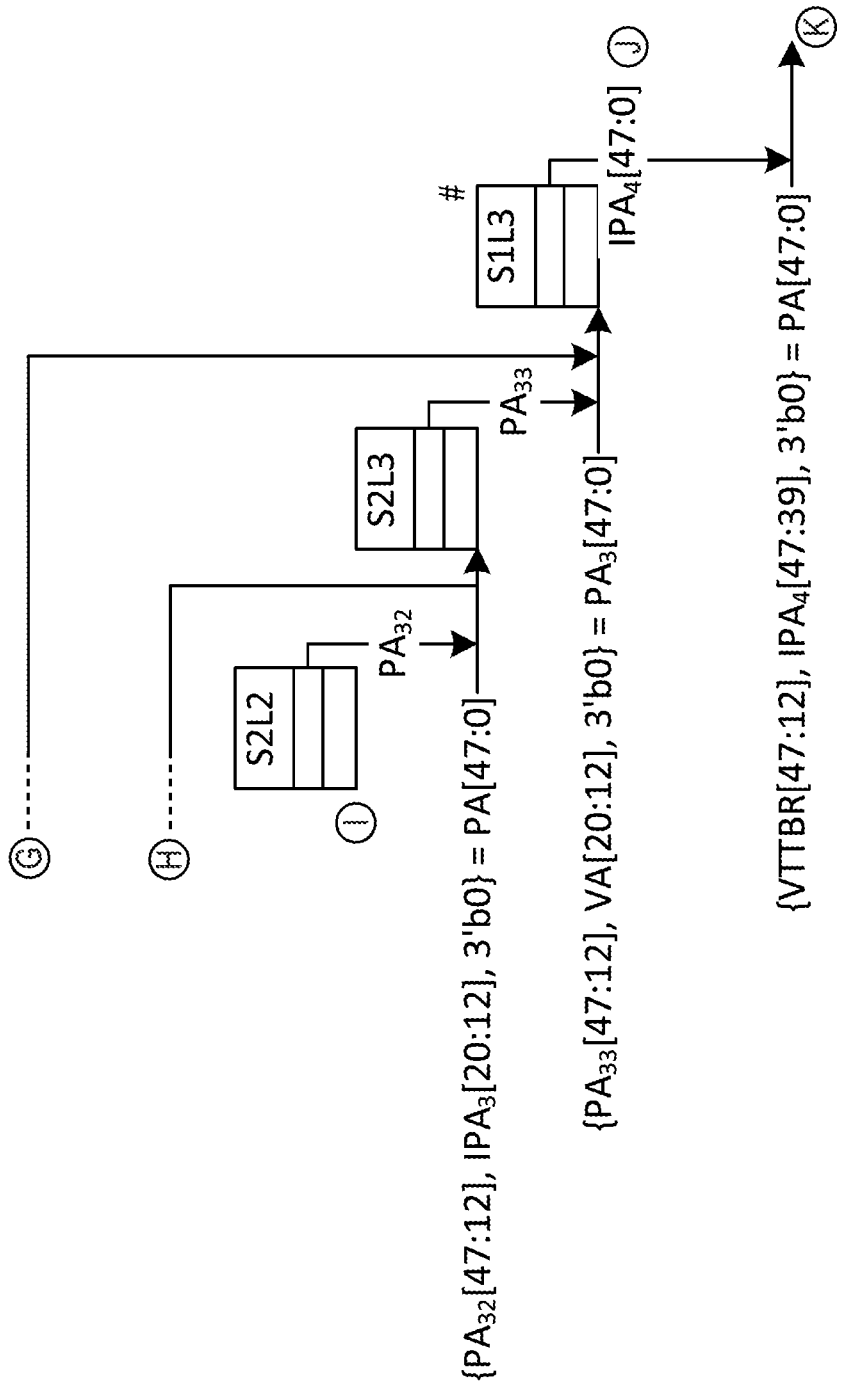
Figure 12:
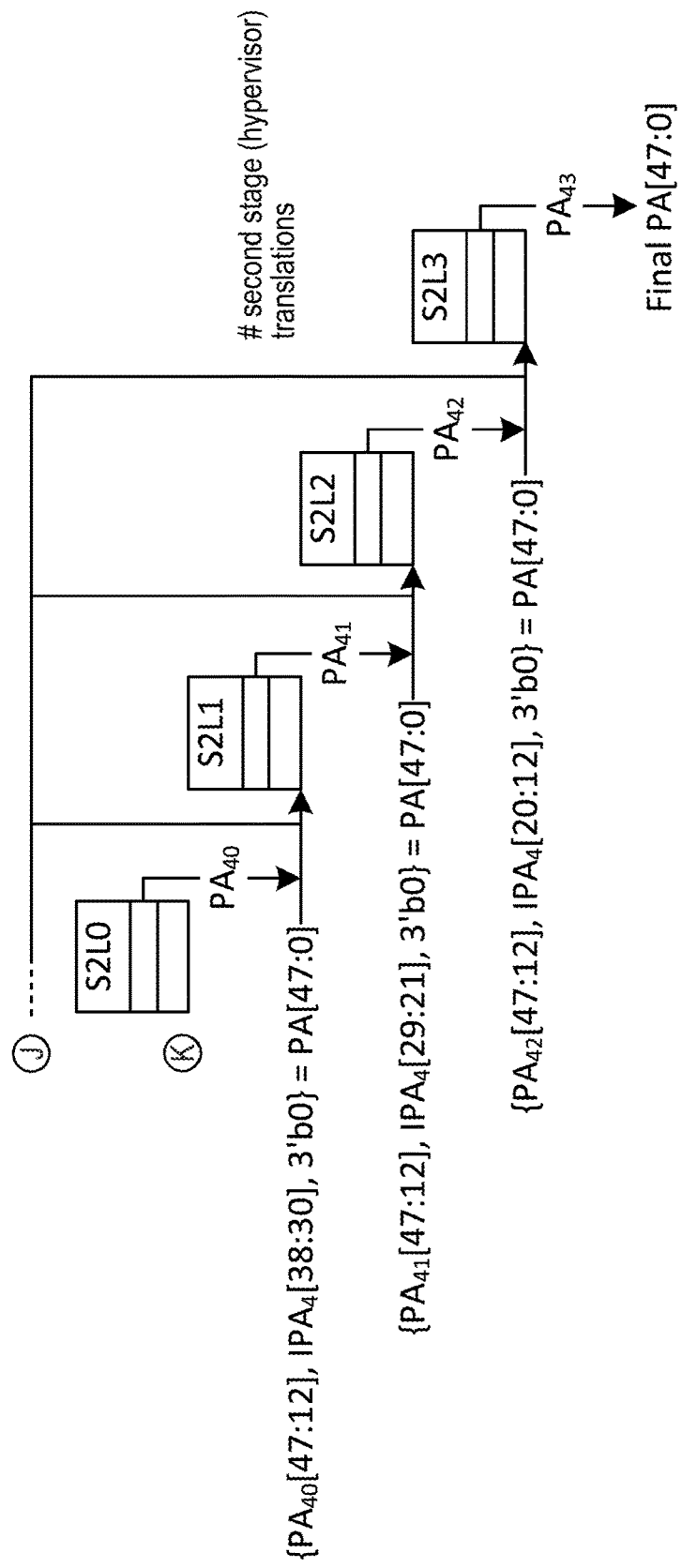

Whilst in one embodiment the multi-level page table walk process involves, at each level, a single stage (such as illustrated earlier with reference to FIG. 3), in an alternative embodiment multiple stages may be involved at each level, as will be discussed in more detail later with reference to the example of FIG. 12. For example, multiple stages can be used to implement a virtualized environment where multiple operating systems are controlled by a hypervisor. Hence, in such an arrangement, a first stage of translation may correspond to address translation managed by a guest operating system, whilst a second stage of translation may correspond to address translation managed by a hypervisor. In one embodiment, the unified address translation cache can store address translation data (whether full or partial address translation data) relating to both stages, and in embodiments using such multiple stages, the entry type field 225 can be used to identify which stage of address translation the information in the corresponding entry relates to.

Figure 5:
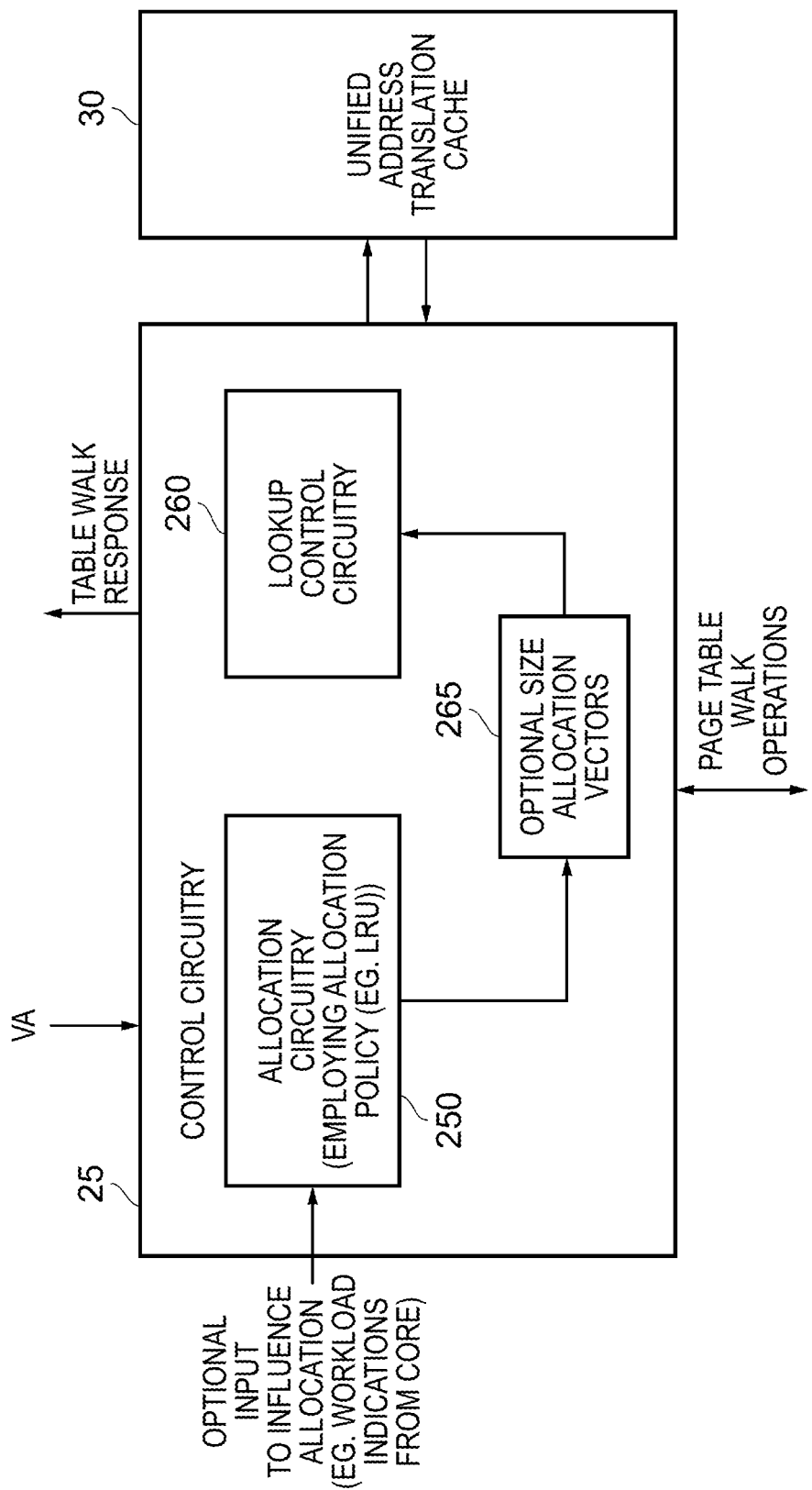
FIG. 5 is a block diagram illustrating in more detail the operation of the control circuitry of FIG. 1 in accordance with one embodiment.

FIG. 5 is a block diagram illustrating in more detail the operation of the control circuitry 25 of FIG. 1. The control circuitry has allocation circuitry 250 used to allocate address translation data into an entry of the unified address translation cache. Hence, for various levels during a page table walk process, it may be decided to cache the associated address translation data within the unified address translation cache. The allocation circuitry can employ any suitable allocation policy to determine an entry in which to store that address translation data. However, it should be noted that there is no separation between the entries used to store partial address translation data and the entries used to store full address translation data, and any entry can be used to store either full address translation data or partial address translation data.

The allocation circuitry could in one embodiment employ a simple allocation policy such as a least recently used (LRU) policy. This would naturally allow the way in which the unified address translation cache is used to dynamically adapt to changing workload conditions. For example, if it is found that full address translation data stored within the unified address translation cache is not being used as often as partial address translation data, then the entries containing full address translation data will naturally tend to be least recently used, and their contents will be overwritten with incoming new address translation data. Over time, this will allow a greater proportion of the address translation cache to be used for storing partial address translation data in that scenario. Conversely, if the partial address translation data is being used less than the full address translation data, then entries containing partial address translation data are likely to be selected to be overwritten with new incoming address translation data, allowing the proportion of the address translation cache used for full address translation data to increase.

Whilst in some embodiments a simple allocation mechanism such as an LRU mechanism may be sufficient, if desired the allocation circuitry can be arranged to optionally receive other input signals that will influence the allocation. For example, it may receive workload indications from the core indicative of the type of activities being performed by the core, and on the basis of that information can decide whether to preferentially overwrite full address translation data or partial address translation data as each new item of address translation data is received for allocation.

When the core issues a virtual address to the control circuitry for an item of data or an instruction that it wishes to access, then the lookup control circuitry 260 will perform a lookup within the unified address translation cache in order to determine if a hit condition is detected. This lookup operation will be discussed in more detail later for both fully associative and set associative structures of the unified address translation cache 30. If the result of the lookup operation is that a hit condition is detected for full address translation data, then the need for any page table walk process can be avoided, and the table walk response can be generated directly by the address translation circuitry 20 based on the information in the hit entry. If instead a hit condition is detected in respect of an entry containing partial address translation data, then this can be used to reduce the number of remaining levels of page table walks to be performed, hence improving performance. If no hit is detected, then a full page table walk process can be implemented in order to obtain the information required for the table walk response to be returned to the core 10, and during that process one or more entries in the unified address translation cache may be allocated to store full and/or partial address translation data obtained during the page table walk process.

As will be discussed in more detail later with reference to the set associative lookup structure, the efficiency of the lookup operation can in some instances be improved if size allocation vectors 265 are maintained by the control circuitry 25. In particular, following a reset, the size allocation vectors can be used to keep a record of the page sizes associated with the address translation data allocated into the unified address translation cache. This information can be maintained for the various different types of address translation data, and where multiple stage address translation is used, for the different stages of address translation. Based on this information, the lookup control circuitry 260 can then determine whether one or more potential lookup operations can be skipped. For example, if the lookup process is currently looking for full address translation data but it is known that full address translation data of one particular page size has never been allocated into the address translation cache, then the lookup control circuitry can omit performing a lookup operation for that assumed page size.

Figure 6:
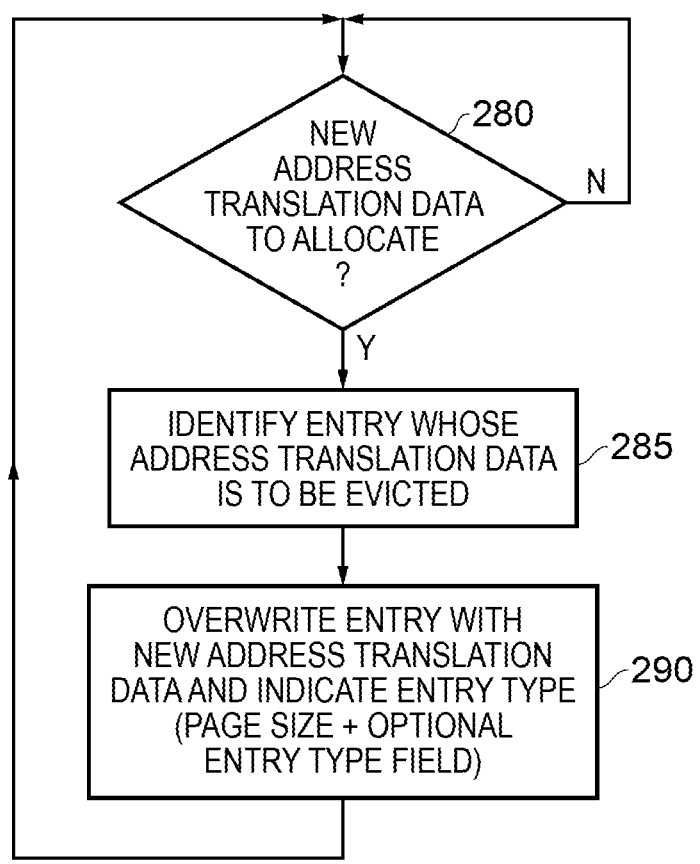
FIG. 6 is a flow diagram illustrating the allocation process employed by the allocation circuitry of FIG. 5 in accordance with one embodiment.

FIG. 6 is a flow diagram illustrating the allocation process that may be performed by the allocation circuitry 250 in one embodiment. At step 280 it is determined whether new address translation data has been provided for allocation. Once new address translation data is provided (which may for example occur during one or more levels of the page table walk process), then at step 285 the allocation circuitry implements the allocation policy in order to identify an entry whose address translation data is to be replaced. As mentioned earlier, in accordance with the allocation policy used, any entry can be used to store any type of address translation data. However, depending on the way in which the unified address translation cache is structured, this does not mean that any entry will necessarily be available for any particular instance of address translation data. For example, if the address translation cache is fully associative, then it will typically be the case that any entry within the cache can be used to store the new address translation data, and hence the allocation policy can be applied across all of the entries of the unified address translation cache. However, if the unified address translation cache is set associative, then despite the fact that any entry can be used to store any type of address translation data, the particular address translation data that is to be allocated will dictate which entries are candidates for storing that address translation data. In particular, in one embodiment the page size information provided within the address translation data that is to be allocated is used to determine a certain number of index bits of the virtual address data provided as part of the address translation data being allocated, with those bits being used as an index into the address translation cache in order to identify a particular set. Once the set has been identified in that way, then the allocation policy can determine which particular entry is selected as the entry whose current address translation data is to be replaced.

Once step 285 has been performed, then at step 290 the identified entry is overwritten with the new address translation data, and the entry type associated with that entry is updated. As mentioned earlier, the page size information itself may be sufficient for this purpose, or alternatively it may be necessary to also populate the optional entry type field 225 in order to identify the type of address translation data stored within that entry. The process then returns to step 280 to await the next address translation data that is to be allocated into the unified address translation cache.

Figure 7A:
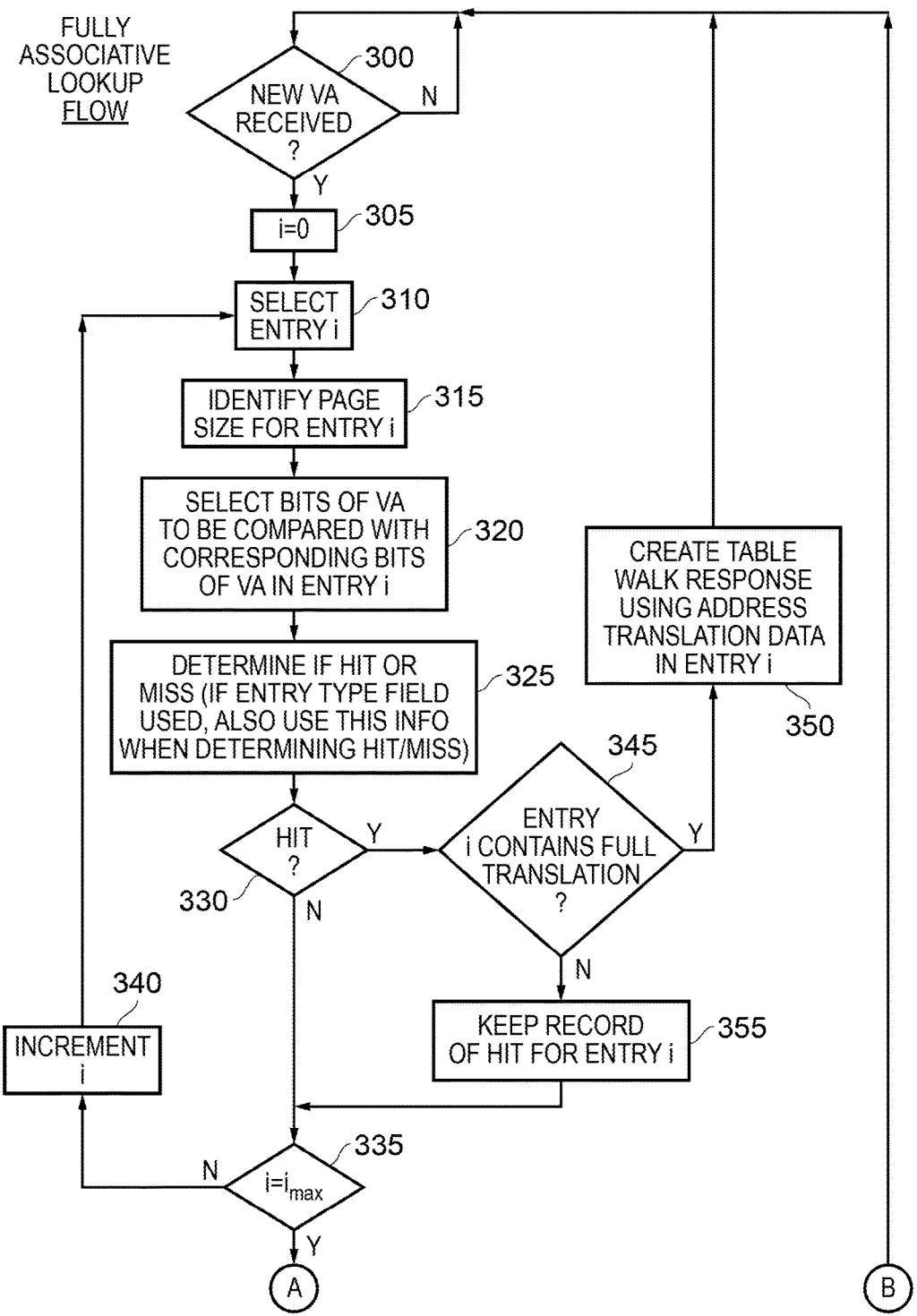
FIGS. 7A and 7B provide a flow diagram illustrating the lookup operations performed by the lookup control circuitry of FIG. 5 in accordance with one embodiment, where the unified address translation cache is a fully associative cache.
Figure 7B:
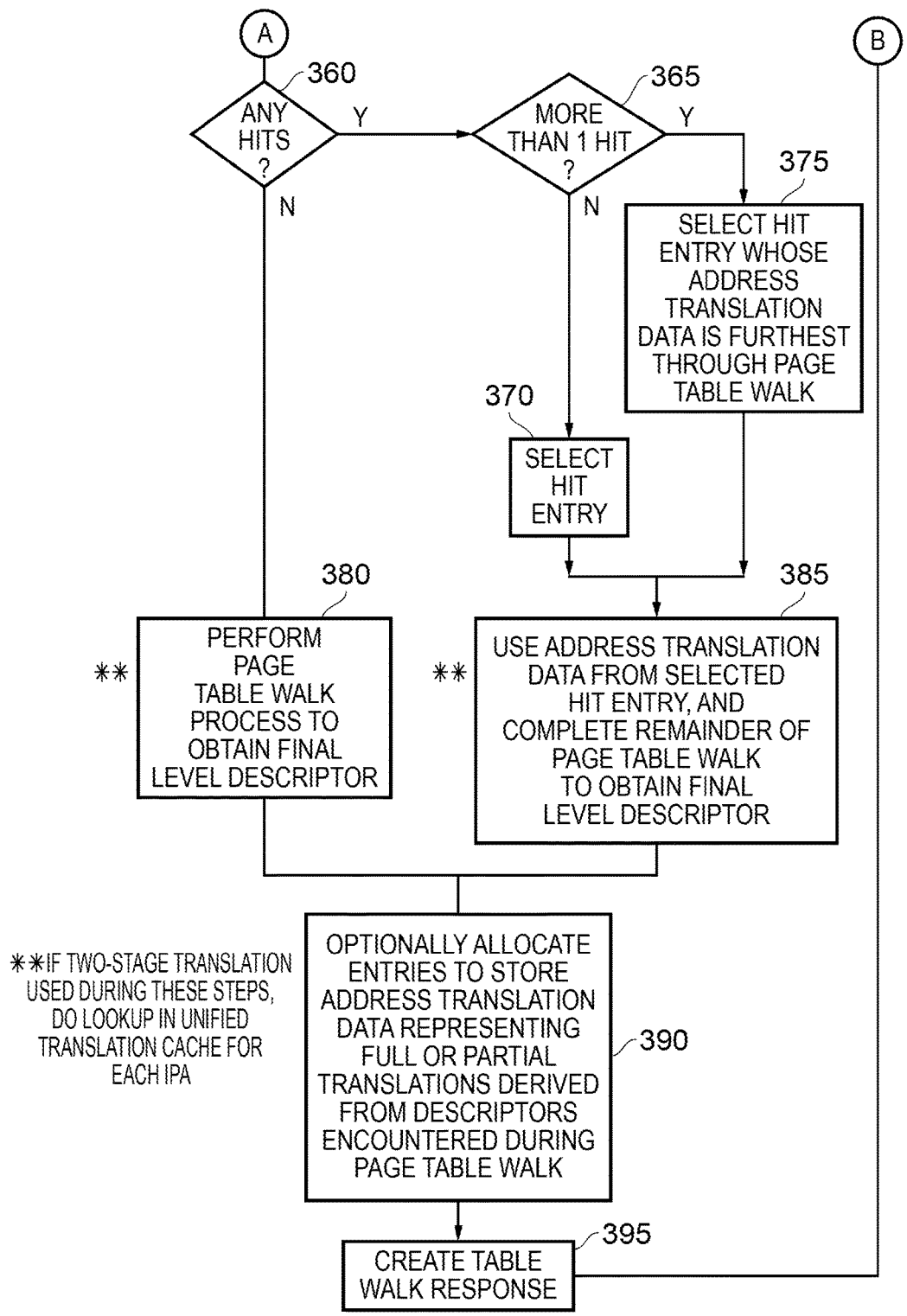

FIGS. 7A and 7B provide a flow diagram illustrating the steps performed in order to implement a lookup process within the unified address translation cache upon receipt of a virtual address, for the embodiment of FIGS. 7A and 7B it being assumed that the unified address translation cache is a fully associative cache, and accordingly any entry can be used for any item of address translation data. At step 300, it is determined whether a new virtual address has been received, and on receipt of the virtual address a parameter i is set equal to 0 at step 305. Thereafter, entry i is selected at step 310, and the contents of entry i are analysed in order to identify the page size information for that entry at step 315.

The page size information is then used to determine which bits of the supplied virtual address are to be compared with corresponding bits within the virtual address field 205 of the entry i. In particular, the page size information will identify which bits of the supplied virtual address comprise the virtual page number bits 55 discussed earlier with reference to FIG. 2. The larger the page size, then the less number of virtual address bits that will need to be compared with corresponding bits in the entry i.

Once the bits of the virtual address to be used as the comparison input is determined at step 320, then at step 325 those bits are compared with the corresponding bits in the virtual address field 205 in order to determine if there is a hit or a miss condition.

At this stage, any additional entry type information 225 that is relevant to detecting a hit or miss will be referred to. For example, if at each level of the page table walk process, multiple stages of address translation are used (for example a first stage associated with a guest operating system and a second stage associated with a hypervisor), then it will be known when the virtual address is provided at step 300 whether the lookup is in relation to a stage 1 translation or a stage 2 translation, and accordingly the information encoded in the entry type field 225 as to whether the corresponding entry relates to a stage 1 or a stage 2 translation will be used in order to ensure that a hit cannot be detected unless the stage information matches.

At step 330 it is then determined whether a hit is detected, and if not the process proceeds to step 335, where it is determined whether there are any more entries to consider. If so, the process proceeds to step 340 where the parameter i is incremented, and the process returns to step 310.

If at step 330 it is determined that a hit is detected, then it is determined at step 345 whether the entry i contains a full translation. If so, then in one embodiment there is no need to continue any remaining part of the lookup process, and instead the process proceeds directly to step 350 where a table walk response is created using the address translation data in entry i, the process then returning to step 300.

However, if the entry that has resulted in the hit condition does not contain a full address translation, in one embodiment it is still considered appropriate to continue to search the other entries in case a hit is detected in respect of an entry that contains a full address translation. Hence, the process proceeds to step 355, where a record is kept of the hit for entry i, the process then proceeding to step 335.

Assuming a full address translation hit is not detected at any point during the process shown in FIG. 7A, then once all entries have been considered, the process will proceed to step 360 in FIG. 7B, where it is determined whether any hits were detected during the lookup process. If not, the process proceeds to step 380 where a page table walk process is performed in order to obtain the required final level descriptor that will enable the full address translation data to be determined.

However, assuming it is determined that there is at least one hit at step 360, it is then determined at step 365 whether there is more than one hit. If not, the hit entry is selected at step 370, and then at step 385 the address translation data from the hit entry is used as a starting point for the remaining portion of the page table walk process, with that remaining portion then being performed in order to obtain the required final level descriptor.

If at step 365 it is determined that there was more than one hit, then at step 375 the hit entry is selected whose address translation data is furthest through the page table walk process. Hence, considering the earlier example of FIG. 3, a hit entry whose partial address translation data relates to level 2 of the page table walk process will be chosen in preference to a hit entry whose partial address translation data relates to level 1 of the page table walk process. The process then proceeds to step 385 where the remaining portion of the page table walk process is performed in order to obtain the final level descriptor.

As indicated by step 390, one or more entries can optionally be allocated during the remaining page table walk process of steps 380 and 385 in order to store address translation data representing full or partial translations derived from the descriptors encountered during the page table walk process.

At step 395 the table walk response is created and returned to the processor core 10 from the address translation circuitry 20, hence enabling the core to then issue a request to the memory system 15 specifying the physical address corresponding to the virtual address, and thereby access the required item of data or instruction. The process then returns to step 300.

It will be appreciated that whilst the process illustrated in FIGS. 7A and 7B has been set out as a sequential process for ease of illustration, in one embodiment lookups can be performed in parallel in multiple of the entries in order to reduce the time taken to perform the lookup process.

If multiple stage address translation is used, then once it has been determined in relation to a first stage address translation that at least a partial page table walk process is required at steps 380 or 385, additional lookup operations can be performed within the address translation cache in relation to stage 2 address translations, using as input the intermediate physical address generated by the stage 1 address translation process. Hence, embedded within steps 380 and 385, there may in such an embodiment be one or more additional lookup operations performed in respect of intermediate physical addresses, those lookup operations essentially following the same sequence of steps as discussed with reference to FIGS. 7A and 7B for a supplied virtual address used during a stage 1 translation.

More details of a two stage, multi-level, address translation process will now be described with reference to FIG. 12. In particular, using a two stage process, the guest operating system controlled translation will convert a virtual address into an intermediate physical address during stage 1, whilst at the stage two translation a hypervisor controlled translation will convert the intermediate physical address into a physical address. Hence, in such a two-stage translation process as shown in FIG. 12, the virtual address 618 is combined with the address in the "guest" base register 620 to generate an intermediate physical address IPA which is translated by the hypervisor to generate the physical address of the first level page descriptor (as illustrating by the four levels of lookup from page table 622 to page table 624). The output from the page table 624 is the physical address of the guest level 0 (S1L0) page table 626. This page is indexed using bits of the VA and the descriptor returned contains an IPA which is translated again by the hypervisor, which produces a physical address of the guest's level 1 (S1L1) page table. This process continues until the physical address for S1L3 is accessed, which returns the final IPA. This IPA is translated (by the hypervisor) to produce the physical address for the data to be accessed, labelled as the "final PA" in FIG. 12. Thus the multiple-level page table walk illustrated in FIG. 12 may at its full extent involve 24 descriptor fetches until the final physical address is generated, having been subject to translation both by the translations managed by the guest operating system and the translations managed by the hypervisor. This type of two stage multiple-level page table walk is used in the Version 8 processor architecture of the processors designed by ARM Limited of Cambridge, England.

By arranging the unified address translation cache of the described embodiments to store both full address translation data and partial address translation data, and, in embodiments where two stage address translation is used, to store entries pertaining to both stages of translation, this can enable a significant reduction in the instances where a full page table walk is required, significantly improving performance.

Figure 8:
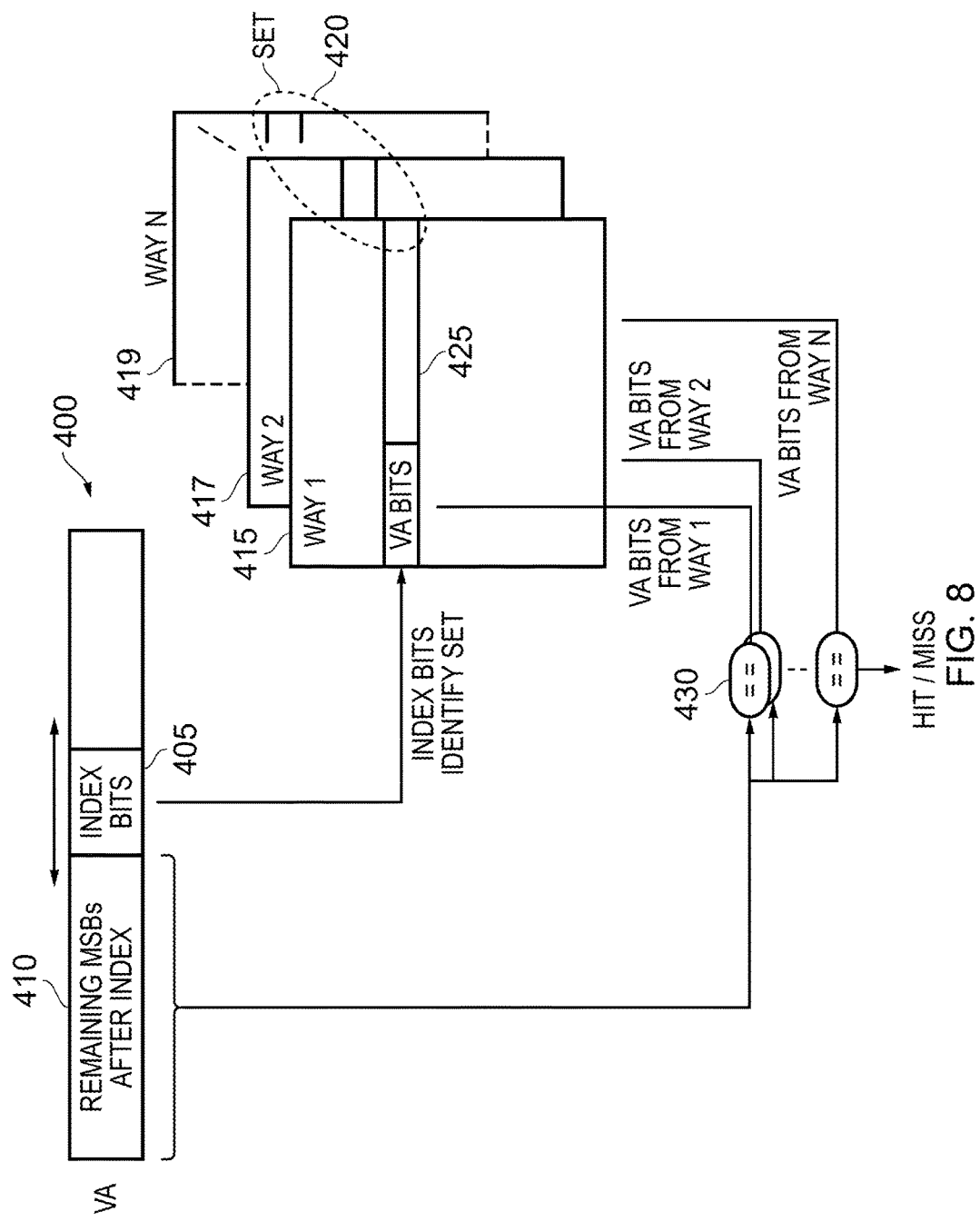
FIG. 8 is a diagram schematically illustrating the lookup process when the unified address translation cache is a set associative cache.
Figure 9:
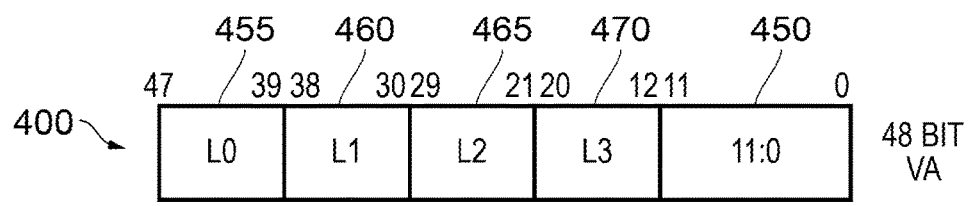
FIG. 9 illustrates how various portions of the virtual address may be used in one embodiment to identify the index bits and the compare bits used in the process illustrated in FIG. 8, dependent on the page size.

FIG. 8 schematically illustrates the lookup process employed when the unified address translation cache is a set associative cache. In particular, a certain number of index bits 405 within the virtual address will be identified based on an assumption about page size, and those bits will be used as an index into the various ways 415, 417, 419 of the set associative structure in order to identify a set 420 containing one entry in each way. The contents of those entries within the set will then be routed to comparison circuitry 430 where the remaining most significant bits 410 of the virtual address (i.e. the bits more significant than the index bits) will be compared with corresponding bits in the virtual address field of each entry 425 in order to detect whether a hit is present. How the page size influences the index bits 405 selected from the virtual address is illustrated schematically in FIG. 9, for the example of a 48-bit virtual address 400 containing the portions 450, 455, 460, 465, 470. The table shown assumes a unified address translation cache with 512 sets. Assuming a 4 KB page size, then bits 20 to 12 (i.e. those associated with the level 3 page table walk process) are chosen as the index bits, with bits 47 to 21 then forming the compare bits. In this example, it is assumed that an entry whose page size indicates 4 KB will relate to full address translation data.

However, in this example, an entry may also contain partial address translation data associated with level 2 of the page table walk process (in this example it being assumed that only a single stage of address translation is used). The page size for such an entry may be 2 MB, and in that instance bits 21 to 29 are used as the index bits, and bits 47 to 30 are used as the compare bits. Similarly, for a partial address translation associated with the level one page table walk process, a 1 GB page size may be used, and in that instance the index bits are formed by bits 38 to 30 with bits 47 to 39 being used as the compare bits.

Figure 10A:
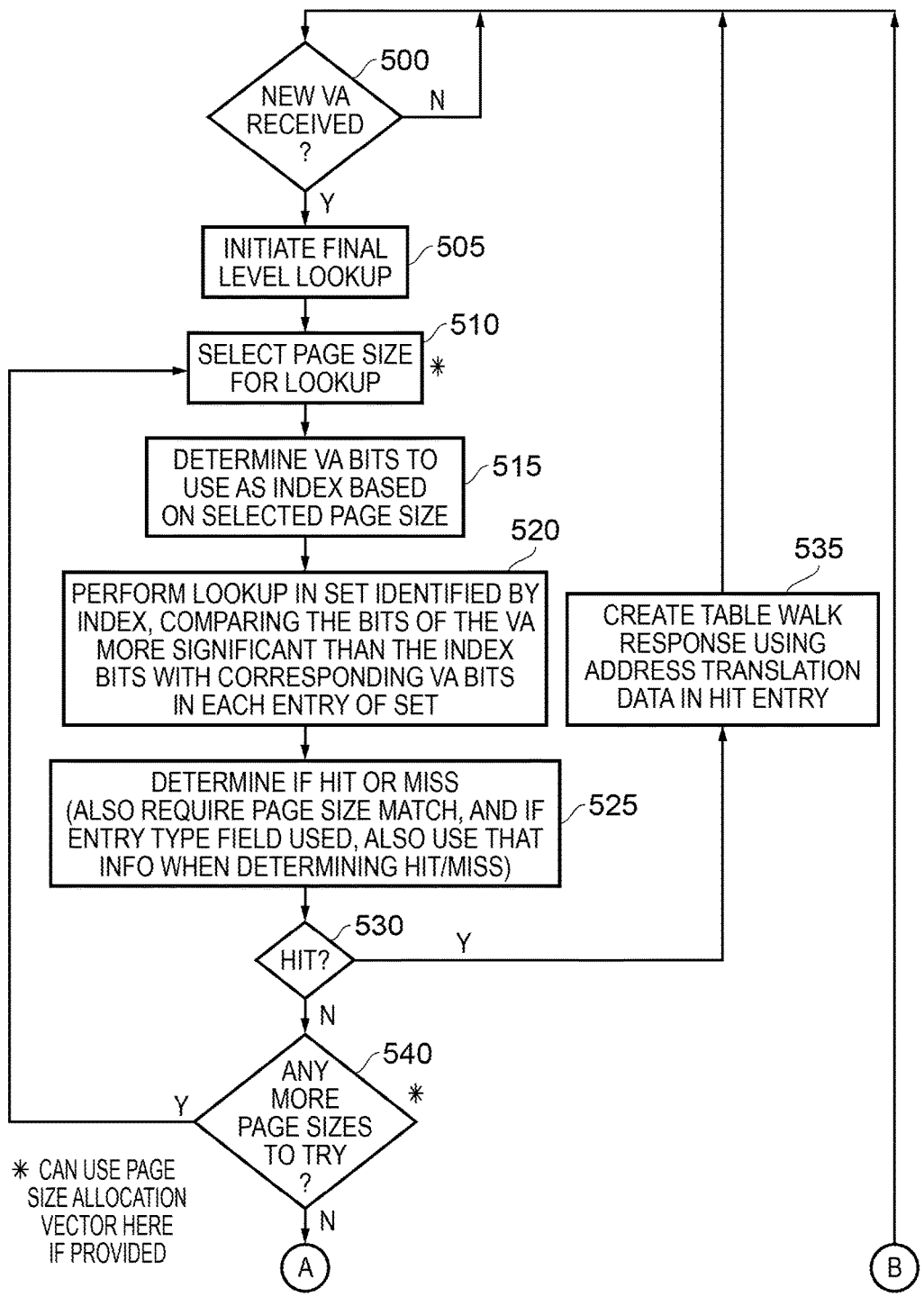
FIGS. 10A and 10B provide a flow diagram illustrating the lookup operations performed by the lookup control circuitry of FIG. 5 in an embodiment where the unified address translation cache is a set associative cache.
Figure 10B:
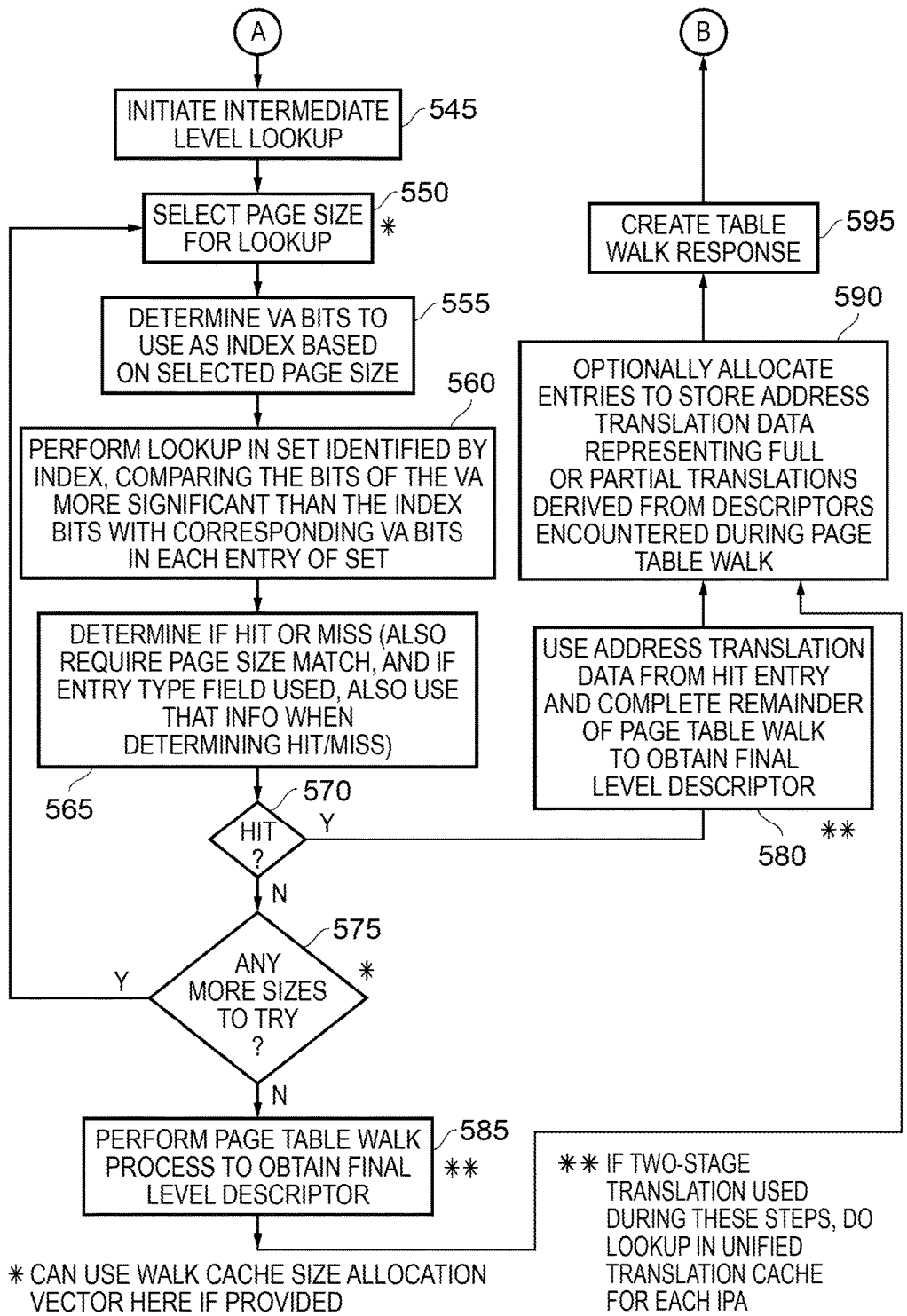

FIGS. 10A and 10B illustrate a lookup process that may be performed for such a set associative unified address translation cache. At step 500, it is determined whether a new virtual address has been received from the core, and once it has then a final level lookup is initiated at step 505. At step 510, a page size is then selected for the current lookup. It may be that only a single page size is associated with full address translation data, but in some embodiments there may be multiple different page sizes that can all legitimately be used for final level pages. In that instance, one of those possible page sizes is chosen at step 510 during the first iteration. If the size allocation vector information 265 discussed earlier with reference to FIG. 5 is maintained, then that information can be referred to when selecting the page size at step 510. For example, if page sizes of 4 KB, 16 KB and 64 KB are all legitimate page sizes for final level pages, but it is known that no entries have been populated for full address translation data relating to 16 KB pages, then during a first iteration the 4 KB page size may be selected, but if a further iteration were later required then a 64 KB page size would be assumed and there would be no need to perform a lookup for a 16 KB page size.

Once the page size has been selected at step 510, then at step 515 the virtual address bits to be used as an index are selected based on the chosen page size. Thereafter, at step 520 a lookup is performed in the set identified by that index, comparing the bits of the virtual address more significant than the index bits with the corresponding virtual address bits in each entry of the set. Thereafter, at step 525 it is determined if a hit has been detected for any of the entries within the set. In order to get a hit, it will be necessary not only for the relevant virtual address bits to match, but also for the page size information held within the entry to match the page size selected at step 510, and for the valid bit 222 to be set to identify that the entry has valid information stored therein. If the entry type field 225 is also used, then this information will also be referred to in order to determine whether there is a hit or a miss. Hence, for example this would prevent a hit being detected when performing a final level lookup, if the entry relates to partial address translation data.

If a hit is detected at step 530, then the process proceeds to step 535 where a table walk response is created using the address translation data in the hit entry. However, if a hit is not detected, then it is determined at step 540 whether there are any more page sizes to try. The size allocation vectors can be referred to at this point if such vectors are provided in order to skip any sizes for which no entries have been made to date in the unified address translation cache. If there are more pages to try, then the process returns to step 510.

In one embodiment, a programming error may be determined to be present if multiple hits are found for final level address translation data, that match with different page sizes. Whilst such a situation may arise when using the fully associative embodiment described earlier with reference to FIGS. 7A and 7B, in the embodiment described with reference to FIGS. 10A and 10B multiple hits will not occur in respect of final level lookups.

As a result of FIG. 10A it will be seen that if at any point a hit is detected when looking for an entry containing full address translation data, then a table walk response will be created at step 535, and the process will return to step 500 to await the next virtual address. However, assuming at step 540 it is determined that there are no more page sizes to try, this will mean that no hit has been detected in respect of full address translation data, and hence the process proceeds to step 545 in FIG. 10B, where an intermediate level lookup is initiated. The general process performed is similar to that performed in respect of the final level lookup discussed in FIG. 10A. Accordingly, at step 550, a page size is selected for the lookup (which in the context of an intermediate level lookup may also be referred to as the descriptor level for a translation size granule), and again if any size allocation vectors have been maintained for partial address translation data, these can be referred to when selecting the page size at step 550.

Thereafter, at step 555, the virtual address bits to use as an index are determined based on the selected page size, and then at step 560 a lookup in the set identified by the index is performed, comparing the bits of the virtual address more significant than the index bits with the corresponding virtual address bits in each entry of the set. It is then determined at step 565 whether a hit has been detected. As discussed earlier with reference to step 525, in order for a hit to be detected, it will be necessary not only for the relevant virtual address bits to match, but also for the page size of the entry to match with the page size selected at step 550, for the valid bit 222 to be set to identify that the entry has valid information stored therein, and indeed for any entry type information over and above page size captured within the entry type field 225 to also match. If it is determined at step 570 that a hit has not been detected, it is then determined at step 575 whether there are any more page sizes to try (again the size allocation vectors can be referred to at this point if such vectors are provided in order to skip any sizes for which no entries have been made to date in the unified address translation cache). Assuming there are more sizes to try, the process returns to step 550.

If at step 570 a hit is detected, then the process proceeds to step 580 where the address translation data from the hit entry is used as a starting point for the remainder of the page table walk process, with the remainder of the page table walk process then being performed to obtain the final level descriptor. If at step 575 it is determined that there are no more page sizes to try, then this means that no hit has been detected within the set associative cache, and accordingly the process proceeds to step 585 where the page table walk process is performed in its entirety in order to obtain the final level descriptor.

Following steps 580 or 585, then the process proceeds to step 595 where a table walk response is created based on the information retrieved during the page table walk process. Also, as shown at step 590, one or more entries can optionally be allocated during the page table walk process to store address translation data representing either full or partial translations derived from descriptors encountered during the page table walk process. As will be apparent from the earlier discussion of FIG. 8, when allocating entries, the size information associated with the address translation data will first need to be considered in order to determine the index bits used to identify a set into which that address translation data can be stored.

In the same way as discussed earlier with reference to steps 380 and 385 of FIG. 7B, during performance of steps 580 and 585, if multi-stage address translation is used, then additional lookup operations may be initiated in respect of the set associative cache to seek to identify hit entries pertaining to stage 2 translations. Each such lookup will use an intermediate physical address as the input for the lookup operation, instead of the original virtual address.

In accordance with one embodiment, it is assumed that a hit in association with a smaller granularity of page size is chosen in preference to a hit in relation to a larger granularity of page size, and hence when selecting the page sizes at step 550, if there are multiple possible page sizes for intermediate level lookups, the smallest page size is chosen during the first iteration, and each subsequent iteration chooses the next smallest page size.

Whilst in the example embodiment discussed with reference to FIGS. 10A and 10B, it is assumed that the order in which the page sizes are selected for the lookup process is such that as soon as a hit is detected, the address translation data from that hit entry can be used to complete the page table walk (if necessary) and create the table walk response, the order in which the lookups are processed for the different page sizes can be varied if desired. In that event, a record of hit entries can be temporarily maintained (as per the approach described for the fully associative example of FIGS. 7A and 7B) until such time as it can be determined which of potentially multiple hit entries should be used. This will hence involve determining which of those hit entries holds address translation data that is furthest through the page table walk; in one embodiment this will be determined separately for each stage if there are multiple stages of address translation.

Figure 11:
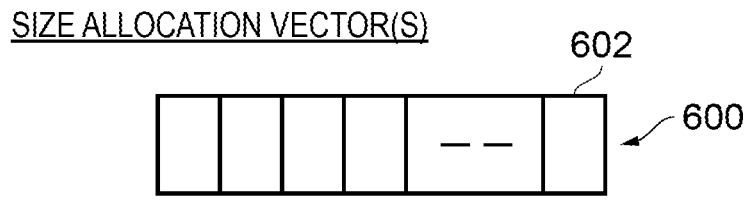
FIG. 11 schematically illustrates a size allocation vector that may be used in accordance with one embodiment.

FIG. 11 illustrates an example of a size allocation vector 600 that may be used in one embodiment. In this embodiment, it is assumed that multiple single bit fields 602 are provided within the vector, each bit being associated with one of the possible sizes of page for the particular type of address translation that the vector is associated with. When address translation data for a page of that size is stored in the unified address translation cache, the corresponding bit is set, thereby identifying to the lookup circuitry that an entry relating to address translation data of that page size has been stored, and hence that it is appropriate to perform a lookup operation in respect of that page size. Conversely, if any of the bits are still cleared at the time the lookup is to be performed, then the lookup process can skip performing a lookup for the associated page sizes.

Whilst in one embodiment a single size allocation vector could be provided, in an alternative embodiment separate vectors can be provided for each type of address translation data. Hence, a separate vector may be provided for full address translation data and at least one further separate vector may be provided for partial address translation data. In addition separate vectors may be maintained for stage one translations and stage two translations if desired. In a further alternative embodiment, separate vectors may be maintained for stage one and stage two translations, but it may be considered not necessary to maintain separate vectors for full address translation data and partial address translation data.

From the above described embodiments, it will be seen that such embodiments provide a unified address translation cache that is able to store both full address translation data and partial address translation data, and where the contents may adapt dynamically to changing workload conditions so as to make more optimum use of the available resources for storing address translation data.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:
1. An apparatus comprising:
an address translation cache having a plurality of entries, each entry to store address translation data used when converting a virtual address into a corresponding physical address of a memory system;

control circuitry to perform an allocation process to determine the address translation data to be stored in each entry;

the address translation cache arranged to store address translation data of a plurality of different types representing address translation data specified at respective different levels of address translation within a multiple-level page table walk, said plurality of different types comprises a final level type of address translation data that identifies a full translation from the virtual address to the physical address, and at least one intermediate level type of address translation data that identifies a partial translation of the virtual address; and the control circuitry arranged, when performing the allocation process, to apply an allocation policy that permits each of the entries to be used for any of said plurality of different types of address translation data, and to store type identification data in association with each entry to enable the type of the address translation data stored therein to be determined, wherein:

each entry has virtual address data associated therewith;

the control circuitry is responsive to a received virtual address, to perform a lookup process to determine with reference to the virtual address data of at least a subset of the entries whether a hit condition is detected the control circuitry is arranged, in the presence of the hit condition being detected for multiple entries, to select one of the multiple entries whose address translation data represents a most complete address translation for the received virtual address.

2. An apparatus as claimed in claim 1, wherein said type identification data comprises at least a page size identifier indicating a page size of a page within the memory system that is associated with the address translation data.

3. An apparatus as claimed in claim 2, wherein said type identification data further comprises additional identification data to distinguish between different types of address translation data that are associated with the same page size.

4. An apparatus as claimed in claim 1, wherein the address translation cache is a fully associative cache, and the control circuitry is permitted, when performing the allocation process for current address translation data, to select any of the entries as an entry into which to store the current address translation data.

5. An apparatus as claimed in claim 1, wherein:

the address translation cache is a set associative cache, and the allocation policy permits each entry in each set to be used for any of said plurality of different types of address translation data; and the control circuitry is arranged, when performing the allocation process for current address translation data, to select a subset of bits of virtual address data specified by the current address translation data in dependence on a page size of a page within the memory system that is associated with the address translation data, and to use said subset of bits as an index to identify a set within the set associative cache, the control circuitry being arranged to store the current address translation data in one of the entries of the identified set.

6. An apparatus as claimed in claim 1, wherein, in response to selecting an entry for which the hit condition has been detected, the control circuitry is further arranged, when the address translation data stored in that selected entry is of said at least one intermediate level type of address translation data, to perform a remaining part of the multiple-level page table walk required, starting with the address translation data stored in the selected entry.

7. An apparatus comprising:

an address translation cache having a plurality of entries, each entry to store address translation data used when converting a virtual address into a corresponding physical address of a memory system;

control circuitry to perform an allocation process to determine the address translation data to be stored in each entry;

the address translation cache arranged to store address translation data of a plurality of different types representing address translation data specified at respective different levels of address translation within a multiple-level page table walk, said plurality of different types comprises a final level type of address translation data that identifies a full translation from the virtual address to the physical address, and at least one intermediate level type of address translation data that identifies a partial translation of the virtual address; and the control circuitry arranged, when performing the allocation process, to apply an allocation policy that permits each of the entries to be used for any of said plurality of different types of address translation data, and to store type identification data in association with each entry to enable the type of the address translation data stored therein to be determined;

wherein:

each entry has virtual address data associated therewith;

the control circuitry is responsive to a received virtual address, to perform a lookup process to determine with reference to the virtual address data of at least a subset of the entries whether a hit condition is detected;

the address translation cache is a fully associative cache;

for each entry, the control circuitry is arranged to identify a page size of a page within the memory system that is associated with the address translation data stored in that entry, and to determine from said size a subset of the received virtual address bits to be compared with corresponding bits of the virtual address data; and the control circuitry is arranged to detect the hit condition in dependence on whether said subset of the received virtual address bits match the corresponding bits of the virtual address data.

8. An apparatus as claimed in claim 7, wherein:

at each level of the multiple-level page table walk, the translation comprises multiple stages, the type identification data stored in each entry identifies which stage the address translation data is associated with, and the control circuitry is arranged to prevent detection of the hit condition for an entry when the received virtual address relates to a different stage to the stage indicated by the type identification data of that entry.

9. An apparatus comprising:

an address translation cache having a plurality of entries, each entry to store address translation data used when converting a virtual address into a corresponding physical address of a memory system;

control circuitry to perform an allocation process to determine the address translation data to be stored in each entry;

the address translation cache arranged to store address translation data of a plurality of different types representing address translation data specified at respective different levels of address translation within a multiple-level page table walk, said plurality of different types comprises a final level type of address translation data that identifies a full translation from the virtual address to the physical address, and at least one intermediate level type of address translation data that identifies a partial translation of the virtual address; and the control circuitry arranged, when performing the allocation process, to apply an allocation policy that permits each of the entries to be used for any of said plurality of different types of address translation data, and to store type identification data in association with each entry to enable the type of the address translation data stored therein to be determined;

wherein:

each entry has virtual address data associated therewith;

the control circuitry is responsive to a received virtual address, to perform a lookup process to determine with reference to the virtual address data of at least a subset of the entries whether a hit condition is detected;

the address translation cache is a set associative cache;

the control circuitry is arranged to implement the lookup process by performing a sequence of lookup operations, each lookup operation having an associated type, the associated type comprising at least an associated page size;

for each lookup operation the control circuitry is arranged to select a first subset of the received virtual address bits in dependence on the associated page size, and to use said first subset of the received virtual address bits as an index to identify a set within the set associative cache;

the control circuitry is further arranged to identify in dependence on the associated page size a second subset of the received virtual address bits to be compared with corresponding bits of the virtual address data; and the control circuitry is arranged to detect the hit condition during performance of the lookup operation when said second subset of the received virtual address bits match the corresponding bits of the virtual address data within an entry of the identified set and the type identification data for that entry matches the associated type for the lookup operation.

10. An apparatus as claimed in claim 9, wherein the sequence of lookup operations are ordered such that one or more lookup operations for said final level type of address translation data are first performed, and then in the absence of the hit condition being detected one or more lookup operations are performed for said at least one intermediate level type of address translation data.

11. An apparatus as claimed in claim 9, wherein:

the control circuitry is arranged to maintain a record of page sizes of address translation data allocated into entries of the address translation cache; and the control circuitry is arranged to reference said record when determining the sequence of lookup operations to be performed.

12. An apparatus as claimed in claim 11, wherein said record identifies pages sizes of address translation data for each of the different types of address translation data.

13. An apparatus as claimed in claim 9, wherein:

at each level of the multiple-level page table walk, the translation comprises multiple stages, the type identification data stored in each entry identifies which stage the address translation data is associated with, and the control circuitry is arranged to prevent detection of a hit for an entry when the received virtual address relates to a different stage to the stage indicated by the type identification data of that entry.

14. A method of maintaining address translation data within an address translation cache having a plurality of entries, each entry to store address translation data used when converting a virtual address into a corresponding physical address of a memory system, the method comprising:

performing an allocation process to determine the address translation data to be stored in each entry;

storing within the address translation cache address translation data of a plurality of different types representing address translation data specified at respective different levels of address translation within a multiple-level page table walk, said plurality of different types comprises a final level type of address translation data that identifies a full translation from the virtual address to the physical address, and at least one intermediate level type of address translation data that identifies a partial translation of the virtual address; and when performing the allocation process, applying an allocation policy that permits each of the entries to be used for any of said plurality of different types of address translation data, and storing type identification data in association with each entry to enable the type of the address translation data stored therein to be determined;

wherein each entry has virtual address data associated therewith, and the method further comprises:

performing, in response to a received virtual address, a lookup process to determine with reference to the virtual address data of at least a subset of the entries whether a hit condition is detected; and selecting, in the presence of the hit condition being detected for multiple entries, one of the multiple entries whose address translation data represents a most complete address translation for the received virtual address.

* * * * *